(12) United States Patent
Zhou et al.

(10) Patent No.: US 11,401,652 B2
(45) Date of Patent: Aug. 2, 2022

(54) PRE-TREATMENT COMPOSITION AND PRINTABLE MEDIUM

(71) Applicant: Hewlett-Packard Development Company, L.P., Spring, TX (US)

(72) Inventors: Zhang-Lin Zhou, San Diego, CA (US); Xiaoqi Zhou, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 17/269,220

(22) PCT Filed: Dec. 17, 2019

(86) PCT No.: PCT/US2019/066717
§ 371 (c)(1),
(2) Date: Feb. 17, 2021

(87) PCT Pub. No.: WO2020/131787
PCT Pub. Date: Jun. 25, 2020

(65) Prior Publication Data
US 2021/0324575 A1 Oct. 21, 2021

(30) Foreign Application Priority Data

Dec. 18, 2018 (WO) ................ PCT/US2018/066169
Sep. 30, 2019 (WO) ................ PCT/US2019/053755

(51) Int. Cl.
*D06M 15/564* (2006.01)
*B41M 5/00* (2006.01)
*B41M 5/52* (2006.01)

(52) U.S. Cl.
CPC ........ *D06M 15/564* (2013.01); *B41M 5/0017* (2013.01); *B41M 5/5281* (2013.01)

(58) Field of Classification Search
CPC . D06M 15/564; B41M 5/5281; B41M 5/0017
(Continued)

(56) References Cited

U.S. PATENT DOCUMENTS

| 5,187,198 A | 2/1993 | Nishida et al. |
| 6,248,161 B1 | 6/2001 | Nguyen et al. |

(Continued)

FOREIGN PATENT DOCUMENTS

| EP | 1321301 | 1/2007 |
| EP | 3150648 A1 | 4/2017 |

(Continued)

OTHER PUBLICATIONS

"Water Based Polyurethane Dispersions (PUD's)"; Kamsons Chemicais Pvt. Ltd.; 4 pgs; accessed Oct. 22, 2018.

*Primary Examiner* — Betelhem Shewareged
(74) *Attorney, Agent, or Firm* — HP Inc. Patent Department

(57) ABSTRACT

A pre-treatment composition comprising water, reactive crosslinking agents and polyurethane particles polyurethane particles including sulfonated- or carboxylated-diamine groups, isocyanate-generated amine groups, and polyalkylene oxide side-chains. Also disclosed is a pre-treated printable medium comprising a base substrate and the pre-treatment composition, such as described herein, that is applied over, at least, one side of the base substrate, forming an image-receiving surface. Also disclosed is the method for making such printable medium.

15 Claims, 2 Drawing Sheets

(58) Field of Classification Search
USPC .......................................................... 428/32.6
See application file for complete search history.

(56) References Cited

U.S. PATENT DOCUMENTS

| | | |
|---|---|---|
| 6,924,011 B2 | 8/2005 | Van Aert et al. |
| 6,936,316 B2 | 8/2005 | Nigam et al. |
| 7,041,338 B2 | 5/2006 | Nigam |
| 8,529,057 B2 | 9/2013 | Qiu |
| 8,562,126 B1 | 10/2013 | Xiang et al. |
| 8,754,007 B2 | 6/2014 | Cuch et al. |
| 9,421,808 B2 | 8/2016 | Ferrar et al. |
| 9,434,884 B2 | 9/2016 | Lubnin et al. |
| 9,783,926 B2 | 10/2017 | Irnich et al. |
| 2002/0142139 A1 | 10/2002 | Bermel et al. |
| 2002/0142140 A1 | 10/2002 | Bermel et al. |
| 2003/0087112 A1 | 5/2003 | Nigam |
| 2004/0091692 A1 | 5/2004 | Parrinello et al. |
| 2004/0109958 A1 | 6/2004 | Nigam |
| 2004/0152027 A1 | 8/2004 | Geuens et al. |
| 2005/0065235 A1 | 3/2005 | Bauer |
| 2007/0202280 A1 | 8/2007 | Khoultchaev et al. |
| 2008/0241483 A1 | 10/2008 | Verhoeven et al. |
| 2009/0035478 A1 | 2/2009 | Zhou et al. |
| 2009/0208675 A1 | 8/2009 | Nigam |
| 2014/0202749 A1 | 7/2014 | Saitou et al. |
| 2015/0299942 A1 | 10/2015 | Hong et al. |
| 2015/0299948 A1 | 10/2015 | Pan et al. |
| 2017/0233595 A1 | 8/2017 | Erdodl et al. |
| 2017/0355867 A1 | 12/2017 | Kasperchik et al. |
| 2018/0015764 A1 | 1/2018 | Zhou |
| 2021/0324575 A1* | 10/2021 | Zhou ........................ C09D 7/65 |

FOREIGN PATENT DOCUMENTS

| | | |
|---|---|---|
| JP | 2005179667 A | 7/2005 |
| WO | WO-201 0114899 A1 | 10/2010 |
| WO | WO-201 8017307 | 1/2018 |
| WO | WQ-2018043415 | 3/2018 |
| WO | WO-2018182593 | 10/2018 |
| WO | WO-2019126042 | 6/2019 |

* cited by examiner

PRE-TREATMENT COMPOSITION AND PRINTABLE MEDIUM

BACKGROUND

Textile is a flexible material consisting of a network of natural or artificial fibers which form yarn or thread. Textiles have an assortment of uses in the daily life, such as clothing, bags, baskets, upholstered furnishings, window shades, towels, coverings for tables, beds, and other flat surfaces, and in art. Textiles are used in many traditional crafts such as sewing, quilting and embroidery. The coloration of the textile includes often the dyeing and printing. The dyeing is to apply colorant to the whole fabric network including yarn and thread. The printing is to place the specific design pattern in a special area under the design. Screen printing is a traditional method for fabric textile printing over decades. With the rapid development of digital printing technology, the inkjet printing is increasing its application range and volume in textile printing. The inkjet printing method, such as thermal inkjet and piezoelectric inkjet, dye sublimation inkjet and the alike have been under the investigation and some of the technology have successfully been commercialized in the printing industry.

With these technologies, it is apparent that the image quality of printed images is strongly dependent on the construction of the recording media used. Pre-treatment compositions or coatings can be applied to various textile media to improve printing characteristics and attributes of a printed image.

BRIEF DESCRIPTION OF THE DRAWINGS

The drawings illustrate various examples of the present fabric printable medium and are part of the specification.

DETAILED DESCRIPTION

Figure 1:
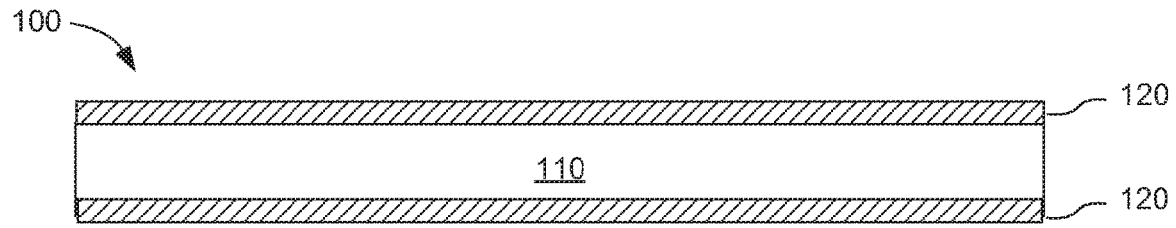
FIG. 1 is a cross-sectional view of a printable medium according to some examples of the present disclosure.

When printing on media substrates, specifically on fabric substrates, challenges exist due to the specific nature of media and of the fabrics. Indeed, often, some media such as fabric does not accurately receive inks. Some fabrics, for instance, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness of the printed images on fabric are often lower compared to images printed on other media types. "Washfastness" or durability after washing is a specific concerns for fabrics and textile that are regularly washed. The washfastness is the properties to maintain the color density on the surface of textile materials during washing. Washfastness could also be defined as a fabric colors resistance where the color will not fade or run when washed in the water and when washed with detergents.

To improve the performance, a process as called "pre-treatment" can be applied to the surface of the fabric substrate before printing and the composition is able to form the strong binding actions to the ink and fabric substrate, so that washing fastness is dramatically improved. The pre-treatment refers to apply a special formulated chemical composition to the textile substrate prior to printing. Specifically, as disclosed herein, the pre-treatment refers to the application of a special formulated chemical composition by an analog method such as padding, rolling and spraying to a textile substrate and drying, before the textile being inkjet printed. The inkjet printing is completed based on a "wet-and-dry" basis.

The pre-treatment can also be called and referred to as coating composition. Such coating composition is indeed coated on a base substrate. In some example, the coating composition is coated onto a fabric base substrate and is thus called fabric coating composition. The term "coating" and "coated" is used herein to describe the coating composition, or to describe a composition applied to a surface of a fabric substrate. However, it is noted that the terms "coating" or "coated" may or may not indicate the presence of a continuous layer of a composition applied on top of the fabric substrate as a discrete layer, but rather can more typically be similar in nature to a surface treatment that may penetrate the fabric substrate surface in some examples and/or alter the surface chemistry of the fabric substrate. Thus, the terms "coating" and "coated" should be interpreted to include compositions that modify the surface of the fabric substrate in some manner, either by a separate layer of material or by surface modification or treatment of the fabric substrate.

In one example, the present disclosure is drawn to a pre-treatment composition comprising water, a reactive crosslinking agent and salt-compatible polyurethane particles including sulfonated- or carboxylated-diamine groups, isocyanate-generated amine groups, and polyalkylene oxide side-chains. In some other examples, the present disclosure relates to a pre-treated printable medium, comprising a base substrate and a pre-treatment composition forming an image-receiving surface, and comprising a reactive cross-linking agent and salt-compatible polyurethane particles including sulfonated- or carboxylated-diamine groups, isocyanate-generated amine groups, and polyalkylene oxide side-chains. The present disclosure also relates also to a method for forming said pre-treated printable medium.

The present technology relates to pre-treatment compositions for print media. Such pre-treatment composition can be applied to various media to improve, for example, printing characteristics and attributes of an image. In some examples, the pre-treatment composition is a pre-treatment composition that is going to be applied to a fabric printable recording media. The pre-treatment composition is can be to an uncoated printable recording media. Or can be applied to an already coated printable recording media with a chemical composition which is the same or different as the pre-treatment composition described.

The present technology relates also to printable medium comprising a pre-treatment composition. In some specific examples, the printable medium is a fabric printable medium. When pre-treated with the pre-treatment composition according to the present disclosure, the printable recording medium (or printable media) will provide printed images with good image quality and outstanding print durability such as washfastness, which is particularly useful for fabric substrates. The durability of the printed ink on the coated fabric media can be tested by washing, for example by performing a washfastness test that includes five (5) standard washing machine cycles using warm water and a standard clothing detergent.

Figure 2:
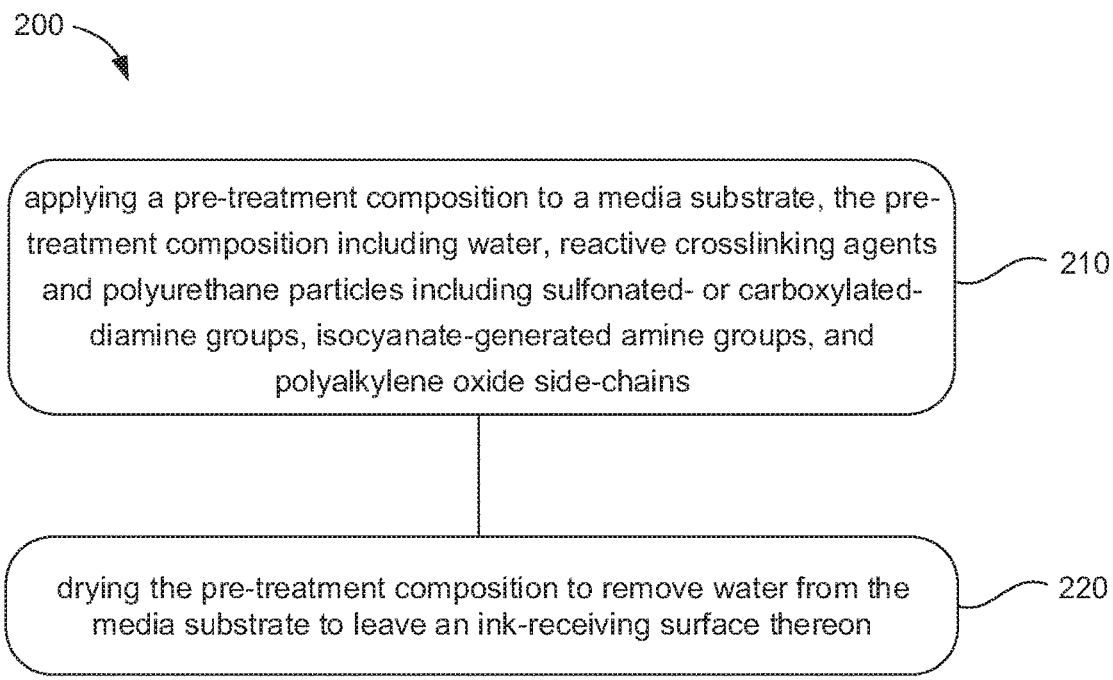
FIG. 2 is a flowchart illustrating a method for producing a printable medium according to one example of the present disclosure.
Figure 3:
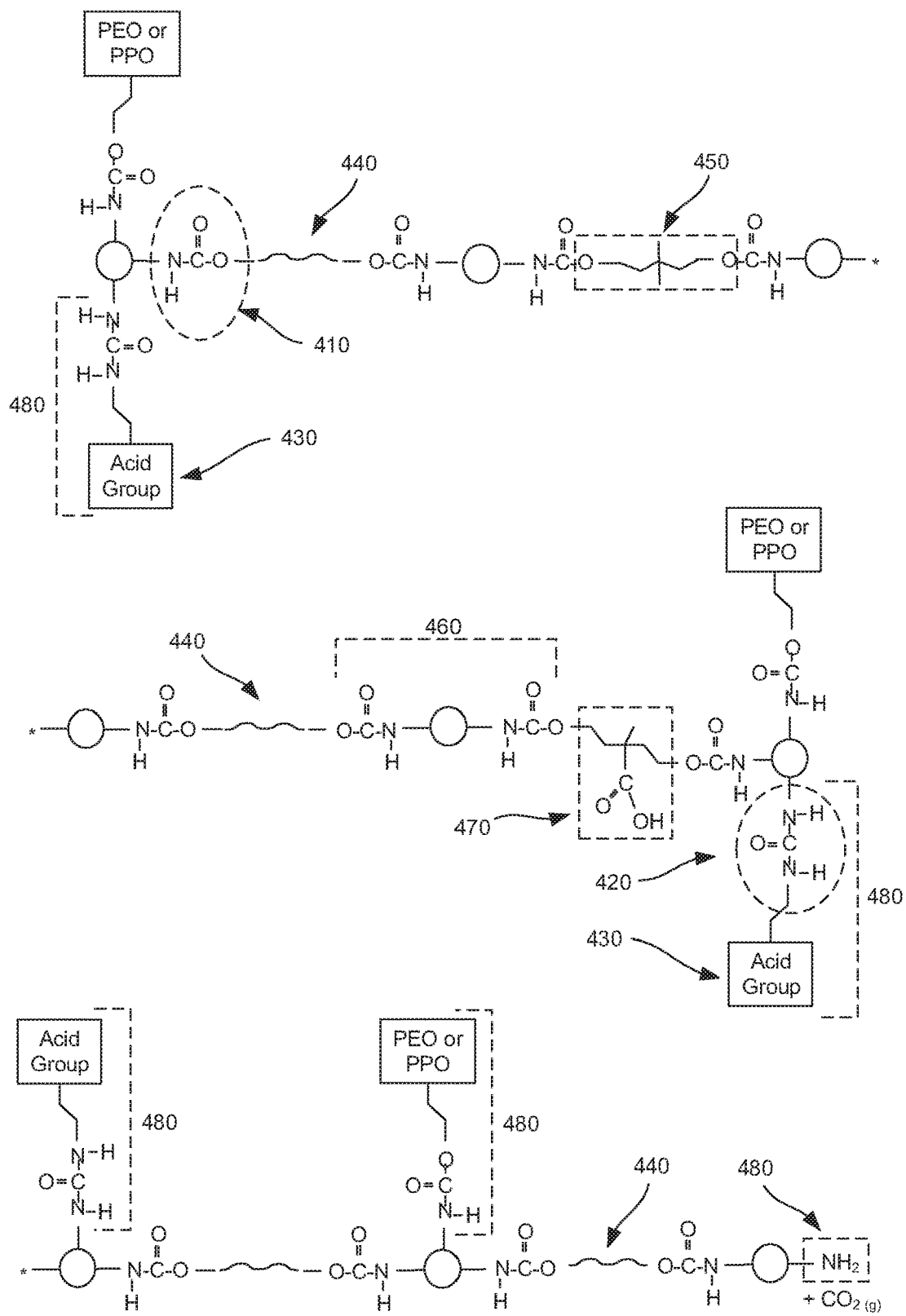
FIG. 3 is an example portions of salt-compatible polyurethane particles that can be included in pre-treatment compositions and print media coatings in accordance with the present disclosure.

FIG. 1 schematically illustrate some examples of the printable medium (100) as described herein. FIG. 2 is a flowchart illustrating an example of a method for producing the printable medium. FIG. 3 is an example portions of salt-compatible polyurethane particles that can be included in the pre-treatment compositions described herein.

In some examples, such as illustrated in FIG. 1, the printable medium (100) encompasses a base substrate (110) with image-receiving coating layers (120) that are applied on both sides of the base substrate (110). The coating layer (120) that result from the application of the pre-treatment composition as described herein will form an image-receiving surface that can also be called ink-receiving layer. In theory, both the side of the media thus be printed.

An example of a method (200) for forming a printable medium in accordance with the principles described herein, by way of illustration and not limitation, is shown in FIG. 2. As illustrated in FIG. 2, such method encompasses applying a pre-treatment composition as a layer to a media substrate, the pre-treatment composition including water, reactive crosslinking agents and salt-compatible polyurethane particles including sulfonated- or carboxylated-diamine groups, isocyanate-generated amine groups, and polyalkylene oxide side-chains (210) and drying the pre-treatment composition to remove water from the media substrate to leave an image-receiving layer thereon (220) in order to obtain the pre-treated printable medium. When applied on a printable medium, the pre-treatment composition, that comprises water, reactive crosslinking agents and salt-compatible polyurethane particles including sulfonated- or carboxylated-diamine groups, isocyanate-generated amine groups, and polyalkylene oxide side-chains, will form the image-receiving coating surface.

The pre-treatment composition comprises a reactive crosslinking agent. The reactive crosslinking agent can be defined as a chemical with functional groups that is capable of forming a crosslinking reaction with other reactive groups such as amine, carboxyl, hydroxyl, and thiol, of the media substrate, and of the binders present in the pigmented inks, for examples, upon certain condition such as heating at 50° C. to 200° C. for examples.

The reactive crosslinking agent can have a weight average molecular weight ranging from about 100 to about 3,000,000. In some examples, the weight average molecular weight of the reactive crosslinking agent ranges from about 100 to about 1,000,000; or from about 200 to about 500,000; or from about 300 to about 200,000; or from about 300 to about 100,000. In some other examples, the reactive crosslinking agent has a weight average molecular weight of 100,000 or less. In yet some other examples, the weight average molecular weight of the reactive crosslinking agent ranges from about 500 to about 40,000. Any weight average molecular weight throughout this disclosure is in Daltons.

In an example, the reactive crosslinking agent is present in the pre-treatment composition, in an amount ranging from about 5 wt % active to about 75 wt % active based on a total weight of the pre-treatment composition. In further examples, the reactive crosslinking agent is present in an amount ranging from about 10 wt % active to about 60 wt % active; or from about 15 wt % active to about 50 wt % active; or from about 20 wt % active to about 50 wt % active; or from about 30 wt % active to about 60 wt % active, based on a total weight of the pre-treatment composition. In some example, the weight ratio of the salt-compatible polyurethane particles described herein, to the reactive crosslinking agent can be ranging from about 40:60 to about 10:90.

In some example, the crosslink agent is heterocyclic ammonium salt. In some other example, the heterocyclic ammonium salt is a polymeric salt consisting of four membered heterocyclic rings containing a quaternary ammonium as shown in the Formula 1:

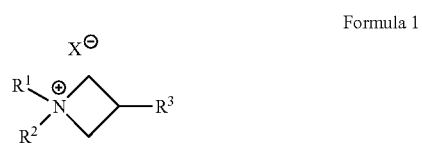

Formula 1

In Formula 1, $R^3$ is hydroxyl group, carboxy, acetoxy, alkoxy, amino or alkyl group, for example, at the 3'-position. $R^1$ and $R^2$ are groups at the 1,1'-nitrogen position and connecting the group to the backbone polymeric in long chain structure that can be polyamide chain and polyalkylenepolyamine chain. The backbone polymeric structure includes, but is not limited to, polyethylene imine, polyamidoamine, the polyamidoaminester, or polyester backbone with pendant secondary amine groups.

When $R^3$ is hydroxyl group, the structure is called azetidinium salts. Such azetidinium salts can be available from the reaction from either primary amine or secondary amine with epichlorohydrin by two-step reaction as shown in equations 1 and 2.

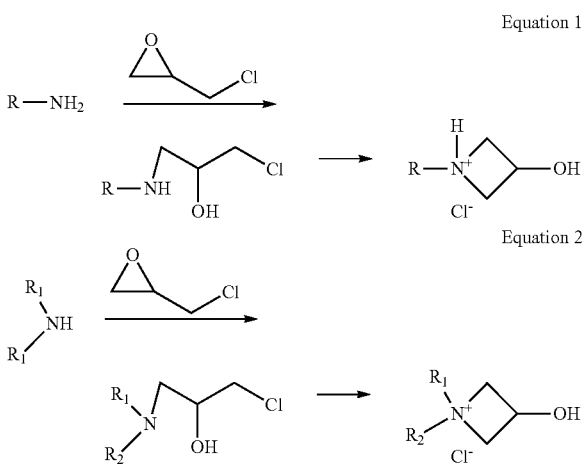

Equation 1

Equation 2

The polymeric heterocyclic salt can be commercially available, for example, under the tradename Beetle® PT746 from BIP (Oldbury) Ltd, Polycup serial from Solenis, Inc such as Polycup® 8210, Polycup® 9200, Polycup® 7535, Polycup® 7360A, Polycup® 2000, Polycup® 172 and Polycup® 9700.

In some examples, the reactive crosslinking agent is an azetidinium-containing polyamine polymer. In some other examples, the reactive crosslinking agent is a polyamine epichlorohydrin resins. In yet some other examples, the reactive crosslinking agent can be selected from the group consisting of poly(diallyldimethylammonium chloride); poly(methylene-co-guanidine) anion, wherein the anion is selected from the group consisting of hydrochloride, bromide, nitrate, sulfate, and sulfonates; a polyamine; poly (dimethylamine-co-epichlorohydrin); a polyethyleneimine; a polyamide epichlorohydrin resin; a polyamine epichlorohydrin resin; and a combination thereof.

The azetidinium-containing polyamine selected for use can include any of a number of cationic polyamines with a plurality of azetidinium groups. In an un-crosslinked state, as shown in Formula 2 below, an azetidinium group generally has a structure as follows:

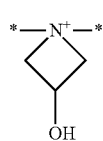

Formula 2

As shown in Formula 2, this structure is not intended to show repeating units, but rather merely a polymer that includes the azetidinium groups shown in Formula 2, including azetidinium-containing polyamines having a weight average molecular weight from 1,000 Mw to 2,000,000 Mw, from 2,000 Mw to 1,000,000 Mw, from 5,000 Mw to 200,000 Mw, from 5,000 Mw to 100,000 Mw, or from 20,000 to 1,000,000 Mw, for example. The asterisks (*) in Formula 2 represent portions of the various organic groups, polymeric portions, functional moieties, etc., for example.

In some examples, the reactive crosslinking agent including the azetidinium-containing polyamine can be derived from the reaction of a polyalkylene polyamine (e.g. ethylenediamine, bishexamethylenetriamine, and hexamethylenediamine, for example) with an epihalohydrin (e.g. epichlorohydrin, for example) (referred to as PAmE resins). In some specific examples, the reactive crosslinking agent including an azetidinium-containing polyamine can include the structure:

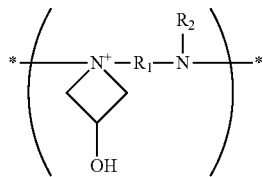

Formula 3 where $R_1$ can be a substituted or unsubstituted $C_2$-$C_{12}$ linear alkyl group and $R_2$ is H or $CH_3$. In some additional examples, $R_1$ can be a $C_2$-$C_{10}$, $C_2$-$C_8$, or $C_2$-$C_6$ linear alkyl group. More generally, there can be from 2 to 12 carbon atoms between amine groups (including azetidinium groups) in the azetidinium-containing polyamine. In other examples, there can be from 2 to 10, from 2 to 8, or from 2 to 6 carbon atoms between amine groups in the azetidinium-containing polyamine. In some examples, where $R_1$ is a $C_3$-$C_{12}$ (or $C_3$-$C_{10}$, $C_3$-$C_8$, $C_3$-$C_6$, etc.) linear alkyl group, a carbon atom along the alkyl chain can be a carbonyl carbon, with the proviso that the carbonyl carbon does not form part of an amide group (i.e. $R_1$ does not include or form part of an amide group). In some additional examples, a carbon atom of $R_1$ can include a pendent hydroxyl group. The number of units as shown in Formula 3 can be any number of units that results in an azetidinium-containing polyamine having a weight average molecular weight from 1,000 Mw to 2,000,000 Mw, from 2,000 Mw to 1,000,000 Mw, from 5,000 Mw to 200,000 Mw, from 5,000 Mw to 100,000 Mw, or from 20,000 to 1,000,000 Mw, for example. These units can be repeating along the polymer, along portions of the polymer, and/or can have other moieties between individual units shown in Formula 3. Thus, the asterisks (*) in Formula 3 represent portions of polymer that are not shown, but could include various organic groups, polymeric portions, functional moieties, etc., for example.

As can be seen in Formula 3, the azetidinium-containing polyamine can include a quaternary amine (e.g. azetidinium group) and a non-quaternary amine (i.e. a primary amine, a secondary amine, a tertiary amine, or a combination thereof). In some specific examples, the azetidinium-containing polyamine can include a quaternary amine and a tertiary amine. In some additional examples, the azetidinium-containing polyamine can include a quaternary amine and a secondary amine. In some further examples, the azetidinium-containing polyamine can include a quaternary amine and a primary amine. It is noted that, in some examples, some of the azetidinium groups of the azetidinium-containing polyamine can be crosslinked to a second functional group along the azetidinium-containing polyamine. Whether or not this is the case, the azetidinium-containing polyamine can have a ratio of crosslinked or un-crosslinked azetidinium groups to other amine groups of from 0.1:1 to 10:1, from 0.1:1 to 5:1, or from 1:1 to 10:1. In other examples, the azetidinium-containing polyamine can have a ratio of crosslinked or un-crosslinked azetidinium groups to other amine groups of from 0.5:1 to 2:1.

Non-limiting examples of commercially available azetidinium-containing polyamines that fall within these ranges of azetidinium group to amine groups include Crepetrol® 73, Kymene® 736, Polycup® 1884, Polycup® 7360, and Polycup® 7360A, which are available from Solenis LLC (Delaware, USA). Other compounds from this or other companies can likewise be used. With more specific detail regarding the Polycup® family of azetidinium-containing polyamines, these resins tend to be formaldehyde-free, water-based crosslinking resins that are reactive with amine groups, carboxyl groups, hydroxyl groups, and thiol groups. Many of these types of groups can be present at the surface of substrates, so in addition to crosslinking that may occur with the polyurethanes that are present in the ink compositions, there can be additional crosslinking at the surface of the print media substrate. The azetidinium-containing polyamines, such as these Polycup® brand resins, in conjunction with the second quaternary amine-containing polymer that is also present in the pre-treatment composition. As one specific example, Polycup® 7360 is a thermosetting polyamine epichlorohydrin that can include the polymer in a fluid carrier at about 38 wt % solids and can have a range of viscosities from about 180 cP to about 300 cP at 25° C., for example.

In some other examples, the reactive crosslinking agent could be a diallylazetidium salt (Formula 4), a bis(2-methoxyethyl)azetidinium salt (Formula 5), a nonylpropylazetidinium salt (Formula 6), a undecylmethylazetidinium salt (Formula 7) or a nonylpropargylazetidinium salt (Formula 8). The reactive crosslinking agent could be used a single reactive crosslinking agent or in combination with different reactive crosslinking agent.

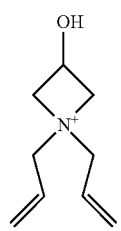

Formula 4

The following Equations 3-9 are additional examples of azetidinium salts based cross-linkers that can be made from the reaction of polyetheramines (such as Jeffamine®) with epichlorohydrin compounds.

-continued

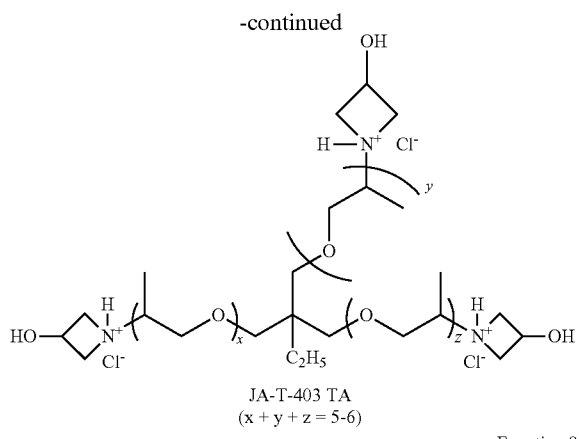

JA-T-403 TA
(x + y + z = 5-6)

Equation 8

Equation 9

The pre-treatment composition comprises salt-compatible polyurethane particles. By definition, the "salt-compatible" function of the polyurethane particles refer to a polyurethane emulsion, or latex, which can withstand the ionic attacking from an ionic species such as a salt. The word "withstand" refers to the fact that there is no gelling and/or precipitation when polyurethane latex and salt solution is mixed at any concentration. It also refers that there is no obvious viscosity increase with time, when polyurethane particles and salt solution are mixed at any concentration. The term "obvious viscosity increase" refers to viscosity change by 10% within 24 hours at room temperature, as measured by a Brookfield viscometer at a spin speed of 100 rpm. The salt-compatible polyurethane can be considered as a film-forming polymer which will form a flexible but tough networked film to provide the pre-treatment composition with durability against mechanical stress, such rubbing scratching and fractioning. The salt-compatible polyurethane also plays a role as the binder to the cationic phosphonium salts so that they will not be removed during application like in printing. The salt-compatible polyurethane has polyurethane backbone on its molecule chains. Unlike most of polyurethane in the market which is readily be crashed out by any salt or cationic species, the polyurethane described herein is salt-compatible by the way to copolymerize PEO/PPO structure onto the backbone of the molecular chain, which in turn reveal salt-compatible characteristic.

In some examples, the salt-compatible polyurethane particles are present in the pre-treatment composition in an amount representing between 2% and 75% of the total weight of the pre-treatment composition. In some other examples, the salt-compatible polyurethane particles are present in the pre-treatment composition in an amount representing between 5% and 50% of the total weight of the pre-treatment composition. In yet some other examples, the salt-compatible polyurethane particles are present in the pre-treatment composition in an amount representing between 10% and 40% of the total weight of the pre-treatment composition. In some example, the weight ratio of the salt-compatible polyurethane particles described herein, to the reactive crosslinking agent can be ranging from about 40:60 to about 10:90.

The salt-compatible polyurethane particles of the present disclosure include sulfonated- or carboxylated-diamine groups, isocyanate-generated amine groups, and polyalkylene oxide side-chains. In one example, the polyalkylene oxide side-chains include polyethylene oxide side-chains, polypropylene oxide side-chains, or a combination thereof. The polyalkylene oxide side-chains can have a number average molecular weight from 500 Mn to 5,000 Mn.

The term "isocyanate-generated amine groups" refers to amino ($-NH_2$) groups that can be generated from excess isocyanate (NCO) groups that are not utilized when forming the polymer precursor, typical present as terminal groups; or to secondary amine ($-NH-$) groups that may be isolated from other functional groups present along the polymer backbone, e.g., $-CH_2CH_2-NH-CH_2-$. These groups can be generated from excess isocyanate (NCO) groups that are not utilized when forming polymer precursor or at other stages in the reaction/preparation of the polyurethane polymer. Upon reacting with water (rather than being used to form the polymer backbone with a diol) the excess isocyanate group can release carbon dioxide, leaving an amino or secondary amine group where the isocyanate group was previously present.

In further detail, as mentioned, there can be two different types of amine groups present on the polyurethane particles, namely sulfonated- or carboxylated-alky diamine groups and isocyanate-generated amine groups. The sulfonated- or carboxylated alky diamine groups can be reacted with a polymer precursor, resulting in some examples as a pendant side chain with one of the amine groups attaching the pendant side chain to a polymer backbone and the other amine group and sulfonate or carboxylate group being present along the pendant side chain. As an example of a carboxylate- or sulfonated diamine, Formula I below shows an alkylamine-alkylamine sulfonate (shown as a sulfonic acid, but as a sulfonate, would include a positive counterion associated with an $5O_3^-$ group), that can be used to form the polyurethane particles of the present disclosure, though there are others, including other alkyl diamines sulfonates, alkyl diamine carboxylates, alicyclic diamine sulfonates, alicyclic diamine carboxylates, aromatic diamine sulfonates, aromatic diamine carboxylates, or combinations thereof. Thus, the alkyl diamine sulfonates shown in Formula I is below is provide by way of example, as follows:

Formula I

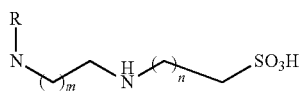

where R is H or is $C_1$ to $C_{10}$ straight- or branched-alkyl or alicyclic or combination of alkyl and alicyclic, m is 1 to 5, and n is 1 to 5. One example of such a structure sold by Evonik Industries (USA) is A-95, which is exemplified where R is H, m is 1, and n is 1. Another example structure sold by Evonik Industries is Vestamin®, where R is H, m is 1, and n is 2.

The isocyanate-generated amine groups, on the other hand, can be generated from excess isocyanate (NCO) groups that are not utilized when forming the polymer precursor, as also mentioned. In further detail, the isocyanate-generated amine groups can be present on the polyurethane particles at from 2 wt % to 8 wt % compared to a total weight polyurethane particle.

The polyurethane particles, as mentioned, also include polyalkylene oxide side-chains, shown schematically at "C," for example. These side-chains can be grafted onto polyurethane polymers, such as Sancure™ polyurethanes are available from Lubrizol Advanced Materials, Inc., USA, or Impranil® polyurethanes are available from Covestro AG, Germany. However, if left unmodified, these polyurethanes are not polyurethanes are not considered to have polyalkyeneoxide side-chains. The polyalkylene oxide side-chains can include polyethylene oxide side-chains, polypropylene oxide side-chains, or a combination thereof. The polyalkylene oxide side-chains can have a number average molecular weight from 500 Mn to 15,000 Mn, or from 1,000 Mn to 12,000 Mn, from 2,000 Mn to 10,000 Mn, or from 3,000 Mn to 8,000 Mn. These side-chains can provide one example benefit of assisting the polyurethane particles with compatibility when co-formulated with a fixing agent, for example. The salt-compatible polyurethane particles can have a D50 particle size from 20 nm to 300 nm, from 75 nm to 250 nm, or from 125 nm to 250 nm, for example. The weight average molecular weight can be from 30,000 Mw to 300,000 Mw, from 50,000 Mw to 250,000 Mw, or from 100,000 Mw to 200,000 Mw.

In some examples, the acid number of the salt-compatible polyurethane particles is lower than 30. The acid number of the salt-compatible polyurethane particles can be from 0 mg KOH/g to 30 mg KOH/g, from 2 mg KOH/g to 20 mg KOH/g, or from 4 mg KOH/g to 15 mg KOH/g, for example.

In some other example, the Glass transition temperature (Tg) value of this polyurethane dispersion is less than 25° C.

In some other examples, the salt-compatible polyurethane particles have a D50 particle size from 20 nm to 300 nm and have an acid number ranging from 0 mg KOH/g to 30 mg KOH/g. In yet some other examples, the salt-compatible polyurethane particles includes sulfonated- or carboxylated-diamine groups, isocyanate-generated amine groups, and polyalkylene oxide side-chains; the polyalkylene oxide side-chains include polyethylene oxide side-chains, polypropylene oxide side-chains, or a combination thereof, and the polyalkylene oxide side-chains have a number average molecular weight from 500 Mn to 15,000 Mn.

In yet some other examples, the salt-compatible polyurethane particles includes sulfonated- or carboxylated-diamine groups, isocyanate-generated amine groups, and polyalkylene oxide side-chains; the polyalkylene oxide side-chains include polyethylene oxide side-chains, polypropylene oxide side-chains, or a combination thereof, and the polyalkylene oxide side-chains have a number average molecular weight from 500 Mn to 15,000 Mn and have a D50 particle size from 20 nm to 300 nm and have an acid number ranging from 0 mg KOH/g to 30 mg KOH/g.

By way of example, the salt-compatible polyurethane particles of the present disclosure can be prepared, in one example, by reacting a diisocyanate with a polymer diol and a small molecule diol, e.g., in the presence of a catalyst in acetone under reflux, to give a compound ready for grafting in the polyethylene oxide (PEO) and/or polypropylene oxide (PPO). Thus, pre-polymer synthesis can include reaction of a diisocyanate with polymeric diol and a small molecular aliphatic diol, for example. The term "aliphatic" as used herein includes saturated C2 to C16 aliphatic groups, such as alkyl groups, alicyclic groups, combinations of alkyl and alicyclic groups, etc., and can include straight-chain alkyl, branched alkyl, alicyclic, branched alkyl alicyclic, straight-chain alkyl alicyclic, alicyclic with multiple alkyl side chains, etc. For example, the small molecule nonionic aliphatic diol can have from $C_2$ to $C_{16}$ carbon atoms, for example; or if the sulfonated- or carboxylated-diamine group(s) are described as aliphatic diamines, they can include sulfonated- or carboxylated $C_2$ to $C_{16}$ carbons in addition to be a diamine.

The reaction can occur in the presence of a catalyst in acetone under reflux to give the pre-polymer, in one example. In some specific examples, other reactants may also be used in certain specific examples, such as organic acid diols (in addition to the polymeric diols) to generate acidic moieties along the backbone of the salt-compatible polyurethane particles. Thus, in addition to diols that may be used to react with the isocyanate groups to form the urethane linkages, a carboxylated diol may likewise be used to react with the diisocyanates to add carboxylated acid groups along a backbone of the polyurethane polymer of the polyurethane particles.

The pre-polymer can be prepared with excess isocyanate groups that compared the molar concentration of the alcohol groups found on the polymeric diols or other diols that may be present. By retaining excess isocyanate groups, in the presence of water, the isocyanate groups can generate amino groups or secondary amines along the polyurethane chain, releasing carbon dioxide as a byproduct. This reaction can occur at the time of chain extension during the process of forming the polyurethane particles. Once the pre-polymer is formed, the polyurethane particles can be generated by reacting the pre-polymer with mono-substituted polyethylene oxide (PEO) alcohol and/or polypropylene oxide (PPO) alcohol, and then with sulfonated- or carboxylated-diamines, to form the polyurethane particles that include the sulfonated- and/or carboxylated-diamine moieties and the polyalkylene oxide moieties. As noted in preparing the pre-polymer, with an excess of isocyanate groups and with the reaction with water, the polyethylene particles also include isocyanate-generated amine groups as well. Next, more water can be added and solvent can be removed by vacuum distillation in some examples, thus, suspending the polyurethane particles in a higher concentration of water. With specific reference to the sulfonated- and/or carboxylated diamine moieties, some may participate in intra-polymer or inter-polymer crosslinking, and some may not participate in crosslinking. Thus, even with some sulfonated- and/or carboxylated diamine moieties not participating in crosslinking, the grafted side chains provided by the PPO and/or PEO moieties can provide protection to the sulfonate and/or carboxylate groups, inhibiting their interaction with any salt or cationic polymer that may be present therewith as a fixing agent, for example.

An example preparation scheme is shown in Table 1, which sets for various steps in one example sequence, as follows:

TABLE 1

| Step | | |
|---|---|---|
| 1 | Initial Reactants | Diisocyanate + Polymeric Diol + Nonionic Aliphatic Diol + Catalyst/Acetone → |
| 2 | Prepolymer | Formation Backbone Including Excess Isocyanate Groups and Urethane Linkages Generated from Polymeric Diols and Nonionic Aliphatic Diols |
| 3 | Polyalkylene Oxide Alcohol Reactant | OH-PEO and/or OH-PPO → |
| 4 | Intermediate Polymer | Prepolymer Modified with Polyalkylene Pendant Groups Attached Via Urethane Linkages with Excess Isocyanate Groups Remaining |
| 5 | Acid-Diamine Reactant | Sulfonated- or Carboxylated-Diamine Groups → |
| 6 | Acidified Polymer | Intermediate Polymer Modified with Sulfonated- or Carboxylated-Diamine Groups with Excess Isocyanate Groups Remaining |
| 7 | Aqueous Dispersion | Water (Remove Acetone) → |
| 8 | Polyurethane Particles Dispersed in Water | Polyurethane Particle Dispersion Including Sulfonated- or Carboxylated-Diamine Groups, Isocyanate-Generated Amine Groups, and Polyalkylene oxide Side-Chains |

Notably, the excess isocyanate groups can be converted to the isocyanate-generated amine groups at any of the stages shown in Table 1 above when there is water for the reaction. Any of the isocyanate groups that may be still be present when water is added would at that point be converted to the isocyanate-generated amine groups. These amine groups can be available for crosslinking, for example.

FIG. 3 provides example portions of salt-compatible polyurethane particles that can be formed, for example, in accordance with the preparative scheme of Table 1 or other similar reaction scheme. This Figure does not show the cross-linking, but rather shows the types of groups or moieties that can be present along the polymer of the polyurethane particles, some of which can be available for internal crosslinking. In FIG. 3, the polyurethane polymer portions shown identify several urethane linkage groups 410, urea groups 420, acid groups (sulfonic acid or carboxylic acid) 430 of example acid-diamines 80 (sulfonated- or carboxylated-diamines), polymerized polymeric diols 440, and polymerized nonionic aliphatic diols 450. Notably, the polymerized polymeric diols and the polymerized nonionic aliphatic diols liberate hydrogens at their hydroxyl moieties to form the urethane linkage groups in some locations. As shown also in FIG. 3, polymerized diisocyanates 460 are also shown, which include urethane linkage groups on either side of a central moiety, with the central moiety being generically as a circle. The central moiety of the polymerized diisocyanates may be provided from any of the diisocyanates shown and/or described herein, or any of a number of other diisocyanates, or can also be representative of multiple different types of diisocyanates used in combination. Thus, the central moieties (shown as a circle) from the diisocyanates can actually be different at the various locations where this central moiety, or circle, is shown in FIG. 3. As another example, there can also be other types of compounds included in the polymerized polyurethane particles beyond that which is shown in Table 1. For example, one of the polyurethane particle portions identifies an example polymerized organic acid diol 470, which is generated from an organic acid diol, e.g., 2,2-bis(hydroxymethyl)propionic acid in this instance. This can be added when generating the prepolymer with the other diols, for example. If an organic acid diol is used, it can be used in addition to the polymeric diol and/or the nonionic aliphatic diol previously described, thus providing a carboxylate group coupled directly to a polymer backbone of the polyurethane polymer in addition to the polymeric or oligomeric portions provided by the polymeric diol. Also shown is an isocyanate-generated amino group 480. This can be generated from any excess isocyanate groups, such as those not otherwise used for other types of polymer modification, e.g., appending acidic-diamines and/or polyalkylene oxides to the polymer. Thus, in examples of the present disclosure, the polyurethane polymer can be self-crosslinked, self-crosslinkable, can include a sulfonated- or carboxylated-diamine, a nonionic aliphatic diol, and an isocyanate-generated amine group, e.g., isocyanate-generated amino group. Other groups may also be present, such as a polymerized organic acid diol, for example. In some examples, it is noted that the isocyanate-generated amine group shown can further react with isocyanates to form additional urethane bonds for crosslinking reactions. However, there can also be amino groups or secondary amines present that remain available for additional crosslinking to print media substrates, printed ink components, etc.

In more specific detail regarding the initial reactants and then additional reactants that can be used in forming the polyurethane particles, example diisocyanates that can be used to prepare the pre-polymer include 2,2,4 (or 2, 4, 4)-trimethylhexane-1,6-diisocyanate (TMDI), hexamethylene diisocyanate (HDI), methylene diphenyl diisocyanate (MDI), isophorone diisocyanate (IPDI), and/or 1-Isocyanato-4-[(4-isocyanatocyclohexyl)methyl]cyclohexane (H12MDI), etc., or combinations thereof, as shown below. Others can likewise be used alone, or in combination with these diisocyanates, or in combination with other diisocyanates not shown.

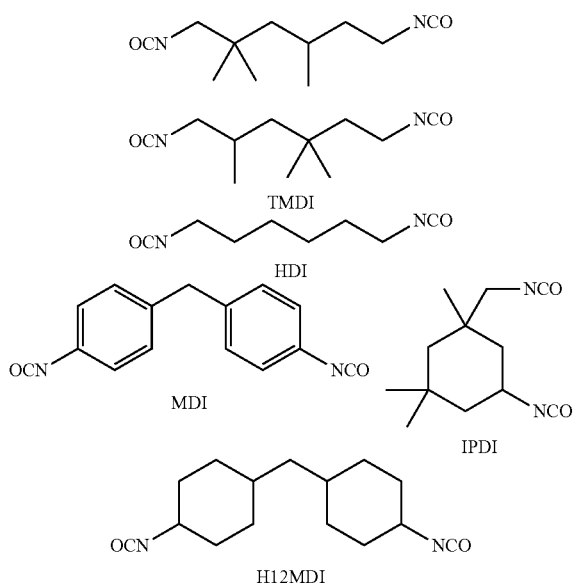

In further detail, there are also polymeric diols as well as small molecular nonionic aliphatic diols that can be used in preparing the polyurethane particles of the present disclosure. Example polymeric diol include polyester diols or polycarbonate diols, for example. Other polymeric diols that can be used include polyether diols, or even combination diols, such as a combination that could be used to form a polycarbonate ester polyether-type polyurethane. In one specific example, however, the polyurethane particles can include polyester polyurethane moieties.

Regarding the nonionic aliphatic diols, these can typically be small molecular diols, e.g., up to an atomic mass of about 300 or defined as having from 2 to 16 carbon atoms and can be included in addition to the polymeric diols described above. The nonionic aliphatic diols of the present disclosure can be included in the polyurethane particles, providing additional chain extension of polyurethane dispersions. Examples of nonionic aliphatic diols that can be used include various alkyl and/or alicyclic diols, including those shown as follows:

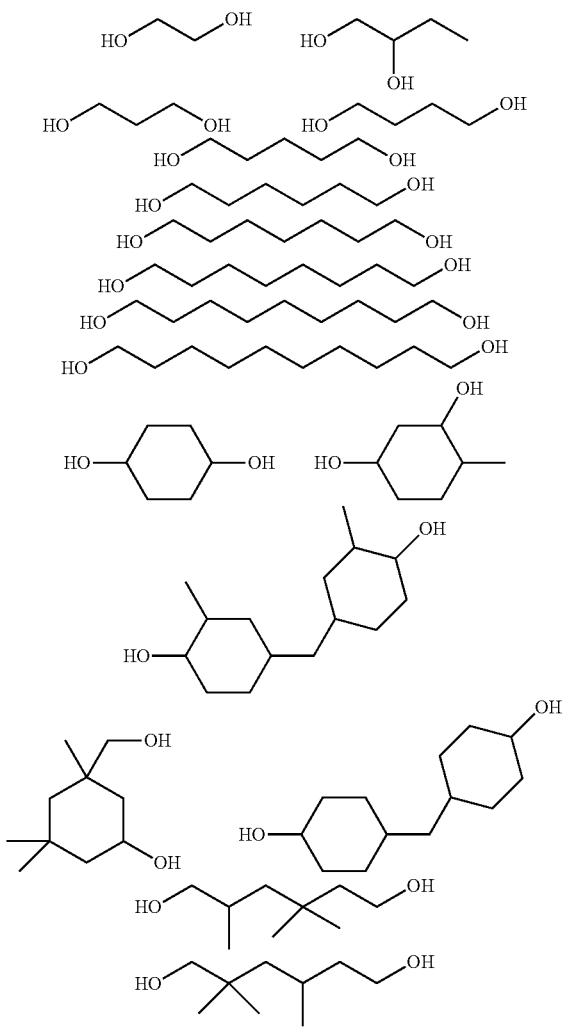

Thus, in some examples, nonionic aliphatic diols can be selected from the group consisting of 1,5-butanediol; 1,2-butanediol; 1,3-propanediol; 1,7-heptanediol; 1,8-octanediol; 1,10-decanediol; 1,5-pemtanediol; 4,4'-methylenebis[2-methyl-cyclohexanol]; 4-methyl-1,3-cyclohexanediol; 4,4'-methylenebis-cyclohexanol; 5-hydroxy-1,3,3-trimehyl-cyclohexanemethanol; 2,2,4-trimethyl-1,6-hexanediol; ethylene glycol; 1,4-cyclohexanediol and 1,6-hexanediol.

Once the pre-polymer is formed, the polyurethane particles can be generated to include the polyalkylene oxide groups as well as the sulfonated- or carboxylated-diamine groups appended on to the polyurethane polymer backbone. As also previously noted, with an excess of isocyanate groups and the presence or introduction of water, the polyethylene particles can also include isocyanate-generated amine groups as well.

With more specific reference to the polyalkylene oxide moieties that can be included, these can be grafted onto the polymer backbone by reacting the pre-polymer with monosubstituted polyalkylene oxide alcohol, such as polyethylene oxide (PEO) alcohol and/or polypropylene oxide (PPO) alcohol, for example. The polyalkylene oxide side-chains that are added or grafted to the polymer backbone can have a number average molecular weight from 500 Mn to 15,000 Mn, from 1,000 Mn to 12,000 Mn, from 2,000 Mn to 10,000 Mn, or from 3,000 Mn to 8,000 Mn, for example. Within these ranges of repeating C2-C3 alkyl oxide groups, polypropylene oxide groups can provide greater weight average molecular weight to the side-chain compared to polyethylene oxide, as there are three carbons present per oxygen compare to two carbons per oxygen. In some examples the polyalkylene oxide side-chains can also be a combination of both C2 alkyl oxide groups and C3 alkyl oxide groups. In connection with the sulfonated- and/or carboxylated diamine moieties, some may participate in intra-polymer or inter-polymer crosslinking, and some may not participate in crosslinking. However, even when some sulfonated- and/or carboxylated diamine moieties do not participate in crosslinking, the grafted side chains provided by the PPO and/or PEO moieties can provide protection to the sulfonate and/or carboxylate groups, inhibiting their interaction with any salt or cationic polymer that may be present therewith as a fixing agent, for example.

With respect to the sulfonated- or carboxylated-diamines that can be used in forming the polyurethane particles as described herein, they can be prepared from any of a number of diamine compounds by adding carboxylate or sulfonate groups thereto. Example diamines can include various dihydrazides, alkyldihydrazides, sebacic dihydrazides, alkyldioic dihydrazides, aryl dihydrazides, e.g., terephthalic dihydrazide, organic acid dihydrazide, e.g., succinic dihydrazides, adipic acid dihydrazides, etc, oxalyl dihydrazides, azelaic dihydrazides, carbohydrazide, etc. Example diamine structures are shown below, with some specific examples of diamines including 4,4'-methylenebis(2-methylcyclohexyl-amine) (DMDC), 4-methyl-1,3'-cyclohexane-diamine (HTDA), 4,4'-Methylenebis(cyclohexylamine) (PACM), isophorone diamine (IPDA), tetramethylethylenediamine (TMDA), ethylene diamine (DEA), 1,4-cyclohexane diamine, 1,6-hexane diamine, hydrazine, adipic acid dihydrazide (AAD), carbohydrazide (CHD), and/or diethylene triamine (DETA), notably, DETA includes three amine groups, and thus, is a triamine. However, since it also includes two amines, it is considered to fall within the definition herein of "diamine," meaning it includes two amine groups. Many of the diamine structures shown below can be used to form the sulfonated- or carboxylated diamine, and thus are shown by way of example below:

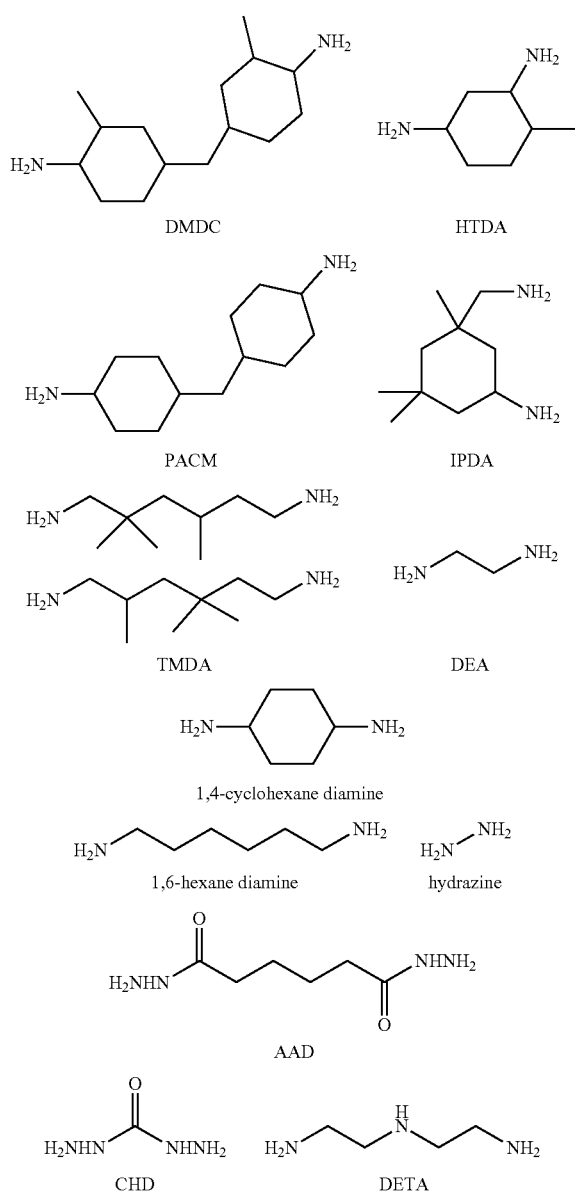

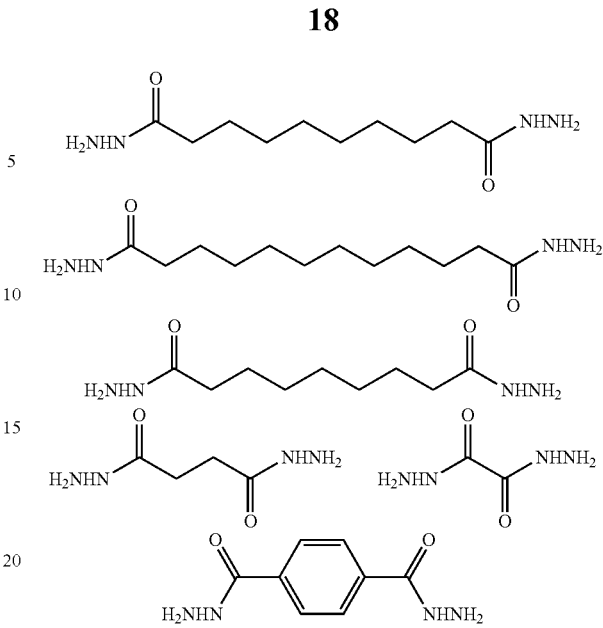

There are also other alkyl diamines (other than 1,6-hexane diamine) that can be used, such as, by way of example:

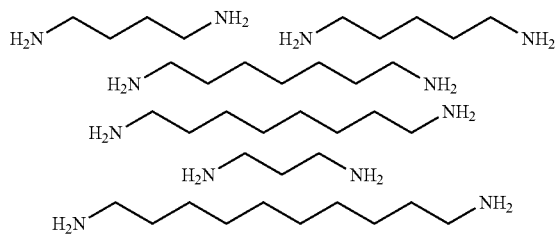

There are also other dihydrazides (other than AAD shown above) that can be used, such as, by way of example:

In some examples, the pre-treatment composition described herein can further comprise colorant fixation agent also called herein fixing agent. Thus, in accordance with examples of the present disclosure, a fixing agent can be included in the pre-treatment composition and on the coated media substrate. The fixing agent can be any species of chemical compounds which carry multiple positive charge center. For metal salts with one metal, the multiple positive charges can be found in a single multivalent metal, or for salts with multiple metals, the multiple positive charge centers can be from multiple monovalent and/or divalent metals.

When present, the fixing agent can include metal inorganic salt, metal organic salt, cationic polymer, or a combination thereof. In some other examples, the fixing agent is cationic polymer including an alkylated quaternary polyamine cationic polymer or an ionene cationic polymer.

In some examples, when present, the fixing agent is present in the pre-treatment composition in an amount representing between 1% and 30% of the total weight of the pre-treatment composition. In some other examples, the fixing agent are present in the pre-treatment composition in an amount representing between 2% and 20% of the total weight of the pre-treatment composition. In yet some other examples, the fixing agent are present in the pre-treatment composition in an amount representing between 5% and 15% of the total weight of the pre-treatment composition.

In one example, the fixing agent can be selected from inorganic multivalent metallic salts, such as Group II metals or Group III metals. Example cationic transition metals that can be used include, without limitation, calcium, copper, nickel, magnesium, zinc, barium, iron, aluminum, chromium, or a combination thereof. Example anionic species that can be used include chloride, iodide, bromide, nitrate, sulfate, sulfite, phosphate, chlorate, acetate, or combinations thereof.

In another example, the fixing agent can be selected from the organic metallic salts. Organic metallic salt are ionic compounds composed of cations and anions with a formula such as $(C_nH_{2n+1}COO^-M^+)*(H_2O)_m$, where $M^+$ is cation species including Group I metals, Group II metals, or Group III metals, for example. Transition metals and other monovalent metals that can be used include, for example, sodium, potassium, calcium, copper, nickel, zinc, magnesium, barium, iron, aluminum, chromium, or a combination thereof. Anion species can include any negatively charged carbon species with a value of n from 1 to 35. The hydrates ($H_2O$) are water molecules attached to salt molecules with a value of m from 0 to 20. Examples of water-soluble salts include, but are not limited to, calcium acetate monohydrate, calcium propionate, calcium propionate hydrate, calcium formate, etc.

Further, in other examples, fixing agent can be a cationic polymer with multiple charge centers. Cationic polymer may have cationic groups as part of the main chain (polymer backbone) or as part of an appended side-chain (pendent group). In one example, the cationic polymer can be a naturally occurring polymer such as cationic gelatin, cationic dextran, cationic chitosan, cationic cellulose, cationic cyclodextrin, etc. The cationic polymer can also be a synthetically modified naturally occurring polymer such as a modified chitosan, e.g., carboxymethyl chitosan, N, N, N-trimethyl chitosan chloride, etc. In one specific example, the cationic polymer can be a polymer having cationic groups as part of the main chain, such as an alkoxylated quaternary polyamine having the structure of Formula II, as follows:

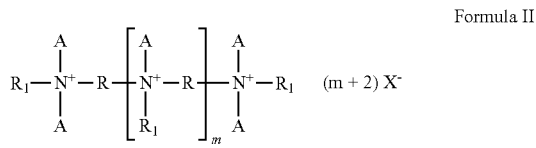

Formula II where R, $R_1$ and A can be the same group or different groups, such as linear or branched $C_2$-$C_{12}$ alkylene, $C_3$-$C_{12}$ hydroxyalkylene, $C_4$-$C_{12}$ dihydroxyalkylene, or dialkylarylene; X can be any suitable counter ion, such as halogen, chloride, bromide, iodide, etc., or other similarly charged anions; and m can be a numeral suitable to provide a polymer having a weight average molecular weight ranging from 100 Mw to 8000 Mw. In this example, the nitrogen atoms along the backbone can be quaternized. Formula II relates to the various commercial products with the trade name Floquat™, which are cationic polymers available from SNF (UK) Ltd., United Kingdom.

In another example, an ionene polymer can used, which is a polymer having ionic groups that are appended to the backbone unit as a side-chain, with an example including quaternized poly(4-vinyl pyridine), having the structure of Formula III, as follows:

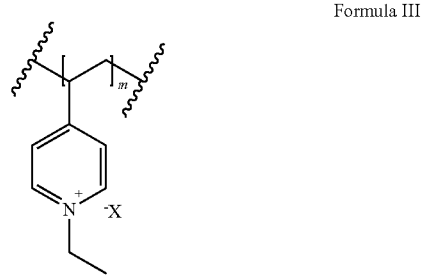

Formula III

Again, in this example, X can be any suitable counter ion, such as halogen, chloride, bromide, iodide, etc., or other similarly charged anions; and m can be a numeral suitable to provide a polymer having a weight average molecular weight ranging from 100 Mw to 8000 Mw.

In yet another example, the cationic polymer can include polyamines and/or a salts thereof, polyacrylate diamines, quaternary ammonium salts, polyoxyethylenated amines, quaternized polyoxyethylenated amines, polydicyandiamides, polydiallyldimethyl ammonium chloride polymeric salts, or quaternized dimethylaminoethyl(meth)acrylate polymers. In another example, the cationic polymer can include polyimines and/or salts thereof, such as linear polyethyleneimines, branched polyethyleneimines, or quaternized polyethylenimines. In another example, the ionene polymer can include a substitute polyurea such as poly[bis (2-chloroethyl)ether-alt-1,3 bis[3-(dimethylamino)propyl] urea], or quaternized poly[bis(2 chloroethyl)ether-alt-1,3-bis [3-(dimethylamino)propyl]. In another example, the cationic polymer can be a vinyl polymer and/or a salt thereof, such as quaternized vinyl imidazol polymers, modified cationic vinyl alcohol polymers, or alkyl guanidine polymers.

In some examples, in addition to the fixing agent, other additives can be used or included, such as pre-treatment composition thickener, such as Tylose® HS-100K, available from SE Tylose GmbH & Co. KG, Germany. Surfactant, such as Pluronic® L61, available from BASF SE, Germany, can also be included. Other commercially-available surfactant that can be used includes the TAMOL™ series from Dow Chemical Co., nonyl and octyl phenol ethoxylates from Dow Chemical Co. (e.g., Triton™ X-45, Triton™ X-100, Triton™ X-114, Triton™ X-165, Triton™ X-305 and Triton™ X-405) and other suppliers (e.g., the T-DET™ N series from Harcros Chemicals), alkyl phenol ethoxylate (APE) replacements from Dow Chemical Co., Elementis Specialties, and others, various members of the Surfynol® series from Air Products and Chemicals, (e.g., Surfynol® 104, Surfynol® 104A, Surfynol® 104BC, Surfynol® 104DPM, Surfynol® 104E, Surfynol® 104H, Surfynol® 104PA, Surfynol® 104PG50, Surfynol® 104S, Surfynol® 2502, Surfynol® 420, Surfynol® 440, Surfynol® 465, Surfynol® 485, Surfynol® 485W, Surfynol® 82, Surfynol® CT-211, Surfynol® CT-221, Surfynol® OP-340, Surfynol® PSA204, Surfynol® PSA216, Surfynol® PSA336, Surfynol® SE and Surfynol® SE-F), Capstone® FS-35 from DuPont, various fluorocarbon surfactants from 3M, E.I. DuPont, and other suppliers, and phosphate esters from Ashland, Rhodia and other suppliers. Dynwet® 800, for example, from BYK-chemie, Gmbh (Germany), can also be used.

In this disclosure, a method of using such pre-treatment composition onto a media base substrate is disclosed. Said composition can be used as a pre-treatment composition for a media substrate and specifically on fabric media substrate. The resulting pre-treated printing media will show excellent image quality and durability on inkjet printing, especially latex based inkjet printing, while maintains good washfastness properties. In some examples, the pre-treatment composition described herein, can be applied to fabric-based substrate; when applied it will form a coating surface that can be called and that can form an image-receiving surface or ink-receiving layer.

The present disclosure relates thus also to a pre-treated printable medium comprising a base substrate (110) and pre-treatment compositions applied over both sides of the base substrate, forming image-receiving surfaces (120), and comprising water, reactive crosslinking agents and salt-compatible polyurethane particles including sulfonated- or carboxylated-diamine groups, isocyanate-generated amine groups, and polyalkylene oxide side-chains. In some examples, the base substrate is a fabric-based substrate.

The resulting coating composition or pre-treatment composition, that comprises water, reactive crosslinking agents and salt-compatible polyurethane particles including sulfonated- or carboxylated-diamine groups, isocyanate-generated amine groups, and polyalkylene oxide side-chains can be applied to a printable medium (100) in order to form an image-receiving surface (120). Such layer would act as the image-receiving surface since, during the printing process, the ink will be directly deposited on its surface. The pre-treated printable medium (100) of the present disclosure, that can also be called herein printable recording media, is a media that comprises a base substrate (110) with a pre-treatment layer surface. The base substrate (110) can also be called bottom supporting substrate or fabric substrate, i.e. an image-receiving surface (120). The word "supporting" refers to a physical objective of the substrate that is to carry the coatings layer and the image that is going to be printed. In some examples, the pre-treated printable medium (100) of the present disclosure, is a fabric printable recording media, meaning that the base substrate (110) is a fabric-based substrate.

The pre-treatment composition described herein can be considered as designed to be applied on a fabric base substrate. The composition is indeed a pre-treatment composition designed to be applied, i.e. to pre-treat, a media substrate and more specifically a fabric media substrate. It is notable that the term "fabric substrate" or "fabric media substrate" does not include materials commonly known as any kind of paper even though paper can include multiple types of natural and synthetic fibers or mixtures of both types of fibers. Thus, textiles and fabrics can be treated with the pre-treatment compositions of the present disclosure, including cotton fibers, treated and untreated cotton substrates, polyester substrates, nylons, silk, blended substrates thereof, etc. The textiles and fabrics can be natural fiber fabrics or synthetic fibers fabrics. Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources such as cornstarch, tapioca products, or sugarcanes, etc. Example synthetic fibers that can be used include polymeric fibers such as nylon fibers (also referred to as polyamide fibers), polyvinyl chloride (PVC) fibers, PVC-free fibers made of polyester, polyamide, polyimide, polyacrylic, polypropylene, polyethylene, polyurethane, polystyrene, polyaramid, e.g., Kevlar® (E. I. du Pont de Nemours Company, USA), polytetrafluoroethylene, fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both of the polymeric fiber and a surface of the fabric, a plasma treatment, a solvent treatment, acid etching, or a biological treatment, an enzyme treatment, or antimicrobial treatment to prevent biological degradation. Thus, the fabric substrate can include natural fiber and synthetic fiber, e.g., cotton/polyester blend. The amount of the various individual fiber types in the blends can vary. For example, the amount of the natural fiber can vary from about 5 wt % to about 95 wt % and the amount of synthetic fiber can range from about 5 wt % to 95 wt %. In yet another example, the amount of the natural fiber can vary from about 10 wt % to 80 wt % and the synthetic fiber can be present from about 20 wt % to about 90 wt %. In other examples, the amount of the natural fiber can be about 10 wt % to 90 wt % and the amount of synthetic fiber can also be about 10 wt % to about 90 wt %. Likewise, the ratio of natural fiber to synthetic fiber in the fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa. The fabric substrate can be in one of many different forms, including, for example, a textile, a cloth, a fabric material, fabric clothing, or other fabric product suitable for applying ink, and the fabric substrate can have any of a number of fabric structures, including structures that can have warp and weft, and/or can be woven, non-woven, knitted, tufted, crocheted, knotted, and pressured, for example. The terms "warp" as used herein, refers to lengthwise or longitudinal yarns on a loom, while "weft" refers to crosswise or transverse yarns on a loom. In some examples, the textile substrate used in this application can be made of any kind of natural and synthetic fabric. In one example, it is cotton textile, include, but not limited to, regular plant cotton, organic cotton, pima cotton, supima cotton and slub cotton. In other examples, it can be made of other textile substrates such as Linen (from the flax plant and has a textured weave), Lycra® (made of spandex. Spandex®, or Lycra®). Further, in other examples, it is the synthetical textile such as polyester, or man-made fiber created from natural trees, cotton, and plants such as rayon. Further in another example, it can be the mixture of both natural fabrics and synthetic fabrics such polyester and cotton 50%/50% blended fabric textile, or tri-blends made up of 3 different types of material which is generally polyester, cotton and rayon. In some examples, the textile substrate may be selected from the same yarn materials such cotton but very different structurally due to weaving method. The material that can be used are, for example, plain weave cotton, end-on-end weave, voile weave, twill weave, Oxford weave. In some examples, it can be made by knitted method using the yarns listed above, or special knitted such as scuba double-knit fabric textile which is usually made of polyester mixed with either Lycra® or Spandex®. In one example, the fabric substrate can have a basis weight ranging from about 100 gsm to about 500 gsm. In another example, the fabric substrate can have a basis weight ranging from about 105 gsm to about 400 gsm. In other examples, the fabric substrate can have a basis weight ranging from about 120 gsm to about 300 gsm, from about 130 gsm to about 200 gsm, from about 150 gsm to about 200 gsm, or from about 175 gsm to about 250 gsm.

The printable medium (100) of the present disclosure comprises a base substrate (110) and an image-receiving coating surface (120) applied over, at least, one side of the base substrate. The image-receiving coating surface is made of the pre-treatment composition described herein; i.e. that comprises water, reactive crosslinking agents and salt-compatible polyurethane particles including sulfonated- or carboxylated-diamine groups, isocyanate-generated amine groups, and polyalkylene oxide side-chains. The pre-treatment composition applied on the image-receiving surface is dried and water is removed subsequently with moisture residual no more than 5% of the total pre-treatment composition In some examples, the composition described is applied to an "uncoated" substrate. By "uncoated", it is meant herein that the media substrate has not been treated or coated by any composition and that the pre-treatment composition is applied directly of the substrate that constitute the media.

The pre-treatment composition of the present disclosure or the image-receiving coating composition can be applied at a dry coat-weight ranging from about 0.1 to about 40 gsm (gram per square meter) or at a coat-weight ranging or from about 1 to 20 gsm (gram per square meter) or at a coat-weight ranging or from about 2 to 10 gsm (gram per square meter) to a media base substrate in order to form image-receiving surfaces (120).

Methods for forming a treated printable medium or coated fabric printable medium are disclosed herein. Such method comprised providing a base substrate and applying the pre-treatment composition as described herein in order to pre-treat the media in order to obtain a treated or coated print medium surface that could be printed. Another example of such method comprised providing a fabric base substrate and applying the pre-treatment composition as described herein in order to pre-treat the fabric textile in order to obtain a coated fabric print medium that could be printed.

When applying the pre-treatment composition to a media substrate or fabric substrate, the coating composition can be applied to any media substrate type using any method appropriate for the coating application properties, e.g., grams per square meter (gsm), viscosity, etc. Application of the pre-treatment composition to the fabric substrate can be at from 0.5 gsm to 10 gsm, from 0.5 gsm to 8 gsm, or from 1 gsm to 8 gsm, from 1 gsm to 5 gsm, without being limiting. The viscosity of the pre-treatment composition, for example, can be similar to that of water or slightly higher if applied as a solution using some coating machines which require low viscosity coating composition such as a sprayer or a padder, e.g., about 1 centipoise (cps) to about 100 cps or about 2 cps to about 50 cps at 20° C., or it can be thicken into a higher viscosity using a chemical thickener. The viscosity of the pre-treatment composition, for example, can be from about 100 cps to about 1,000 cps or from about 200 cps to 1,000 cps at 20° C. Other non-limiting examples of coating methods include paddler size press, slot die, blade coating, and Meyer rod coating, dip coating, etc. In one example, any of a variety of spray coating methods may be used with the present embodiment. In one example, the substrate can be passed under an adjustable spray nozzle. The adjustable spray nozzle may be configured to alter the rate at which the pre-treatment solution is sprayed onto the substrate. By adjusting factors such as the rate at which the fabric substrate is passed under the nozzle, the rate at which the composite solution is sprayed on the fabric, the distance of the fabric substrate from the nozzle, the spraying profile of the nozzle, and/or the concentration of the pre-treatment solution, a coating composition may be applied for any of a number of applications.

Furthermore, the application of the pre-treatment composition can be carried out using padding procedures. The substrate or fabric substrate can be soaked in a bath and the excess can be rolled out. More specifically, impregnated fabric substrates (prepared by bath, spraying, dipping, etc.) can be passed through padding nip rolls under pressure. The impregnated fabric, after nip rolling, can then be dried under heat at any functional time which is controlled by machine speed with peak fabric web temperature. In some examples, pressure can be applied to the substrate after impregnating the base substrate with the pre-treatment composition. In some other examples, the surface treatment is accomplished in a pressure padding operation. During such operation, the base substrate or fabric base substrate is firstly dipped into a pan containing treatment coating composition and is then passed through the gap of padding rolls. The padding rolls (a pair of two soft rubber rolls or a metal chromic metal hard roll and a tough-rubber synthetic soft roll for instance), apply the pressure to composite-wetted textile material so that composite amount can be accurately controlled. In some examples, the pressure that is applied can be from 10 PSI to 150 PSI or, in some other examples, can be from 30 PSI to 70 PSI.

The composition can be dried using box hot air dryer or another drying methodology. The dryer can be a single unit or could be in a serial of 3 to 7 units so that a temperature profile can be created with initial higher temperature (to remove excessive water) and mild temperature in end units (to ensure completely drying with a final moisture level of less than 1-5% for example). The dryer temperature can be programmed into a profile with higher temperature at the beginning of the drying when wet moisture is higher, and then reduced to lower temperature as the coating composition becomes drier, though other drying profiles can likewise be used. The dryer temperature can be controlled to a temperature of less than about 100° C. in one example, and in other examples, the operation speed of the padding/drying line can be from 10 yards/minute to 100 yards/minute, though speeds outside of this range can also be used.

Once the pre-treatment compositions are applied to the base substrate and appropriately dried, ink compositions can be applied by any processes onto the printable medium. In some examples, the ink composition is applied to the printable medium via inkjet printing techniques. A printing method could encompasses obtaining a pre-treated printable medium as defined herein and applying an ink composition onto said fabric printable medium to form a printed image. Said printed image will have, for instance, enhanced image quality and image permanence. In some examples, when needed, the printed image can be dried using any drying device attached to a printer such as, for instance, an IR heater.

The ink composition, that is ejected on the coated fabric print medium includes water, organic co-solvent, pigment having dispersant associated with or attached thereto, and polymer binder particles. As used herein, "ejecting" includes technologies where ink compositions or other fluids are ejected from jetting architecture, such as inkjet architecture. Inkjet architecture can include thermal or piezo inkjet pens. Additionally, such architecture can be configured to print varying drop sizes such as less than 10 nanograms (ng), less than 20 ng, less than 30 ng, less than 40 ng, less than 50 ng, etc. These upper limits can, in one example, also provide the upper limit of various ranges, where 1 ng or 2 ng can represent the lower end of the various range.

Ink compositions that can be printed on the pre-treated fabric printable medium of the present disclosure can be pigmented ink with a binder polymer, such as latex binder particles, e.g., acrylic latex, or polyurethane particles. These solids can be carried by a liquid vehicle that includes water, organic cosolvent, and any of a number of other liquid ingredients, e.g., surfactant, biocide, sequestering agent, dispersing polymer, etc. The polymer binder particles can include, in some more specific examples, imine-cross-linkable groups that are available for reaction with the imine-type crosslinking groups of the crosslinking polymer (found in the coating or the coated fabric print medium, for example).

A wide variety of polyurethanes and/or latex polymers can be used for this purpose. The polyurethane may be aliphatic (straight-chained, branched, and/or alicyclic) or aromatic, or may be any of a variety of types of polyurethane, including polyester-type, some specific examples of commercially available aliphatic waterborne polyurethanes include Sancure® 1514, Sancure® 1591, Sancure® 2260, and Sancure® 2026 (all of which are available from Lubrizol Inc.). Some specific examples of commercially available castor oil-based polyurethanes include Alberdingkusa® CUR 69, Alberdingkusa® CUR 99, and Alberdingkusa® CUR 991 (all from Alberdingk Boley Inc.). Other examples can include polyester-type polyurethanes that may be carboxylated and/or sulfonated. An example aliphatic polyester-polyurethane binder that can be used is Impranil® DLN-SD (Mw 133,000 Mw; Acid Number 5.2; Tg −47° C.; Melting Point 175-200° C.) or Impranil® DL 1380 from Covestro (Germany), and an example of an aromatic polyester-polyurethane binder that can be used is Dispercoll® U42. Example components used to prepare the Impranil® DLN-SD or other similar anionic aliphatic polyester-polyurethane binders can include pentyl glycols, e.g., neopentyl glycol; $C_3$ to $C_5$ alkyl dicarboxylic acids, e.g., adipic acid; $C_4$ to $C_8$ alkyl diisocyanates, e.g., hexamethylene diisocyanate (HDI or HMDI); diamine sulfonic acids, e.g., 1-[(2-aminoethyl)amino]-methanesulfonic acid or 2-[(2-aminoethyl)amino]-ethanesulfonic acid; etc. Example components used to prepare the Dispercoll® U42 or other similar aromatic polyester-polyurethane binders can include aromatic dicarboxylic acids, e.g., phthalic acid; $C_4$ to $C_8$ alkyl dialcohols, e.g., hexane-1,6-diol; $C_4$ to $C_8$ alkyl diisocyanates, e.g., hexamethylene diisocyanate (HDI); diamine sulfonic acids, e.g., 2-[(2-aminoethyl)amino]-methanesulfonic acid or 1-[(2-aminoethyl)amino]-ethanesulfonic acid; etc. Other types of polyurethanes can also be used, such as polyether-type polyurethane, polycarbonate ester-polyether-type polyurethane, and/or polycarbonate-type polyurethane.

Other examples of the polyurethane polymeric compound that can be used include vinyl-urethane, acrylic urethane, polyurethane-acrylic, polyether polyurethane, polyester polyurethane, polycaprolactam polyurethane, or polyether polyurethane. Any of these examples may be aliphatic or aromatic. For example, the polyurethane may include aromatic polyether polyurethanes, aliphatic polyether polyurethanes, aromatic polyester polyurethanes, aliphatic polyester polyurethanes, aromatic polycaprolactam polyurethanes, or aliphatic polycaprolactam polyurethanes.

In another example, the polymer binder particles can be a latex polymer, such as a (meth)acrylic polymers, otherwise referred to as poly(meth)acrylate-based polymer or poly (meth)acrylates. Examples of poly(meth)acrylates include polymers made by hydrophobic addition monomers, such as C1-C12 alkyl acrylates, carboxylic containing monomers (e.g., acrylic acid, methacrylic acid), vinyl ester monomers (e.g., vinyl acetate, vinyl propionate, vinyl benzoate, vinyl pivalate, vinyl-2-ethylhexanoate, vinyl versatate, etc.), vinyl benzene monomer, C1-C12 alkyl acrylamide and methacrylamide (e.g., t-butyl acrylamide, sec-butyl acrylamide, N,N-dimethylacrylamide, etc.), crosslinking monomers (e.g., divinyl benzene, ethylene glycol dimethacrylate, bis(acryloylamido)methylene, etc.), and combinations thereof. As specific examples, polymers made from the polymerization and/or copolymerization of alkyl acrylate, alkyl methacrylate, and/or vinyl esters may be used. Any of the listed monomers (e.g., hydrophobic addition monomers, aromatic monomers, etc.) may be copolymerized with styrene or a styrene derivative. As specific examples, polymers made from the copolymerization of alkyl acrylate, alkyl methacrylate, and/or vinyl esters, with styrene or styrene derivatives may also be useful. The latex polymer, for example, can have an acid number from 0 mg KOH/g to 60 mg KOH/g, from 0 mg KOH/g to 50 mg KOH/g, from 5 mg KOH/g to 60 mg KOH/g, from 5 mg KOH/g to 50 mg KOH/g, or from 10 mg KOH/g to 40 mg KOH/g. The latex polymer can also have a glass transition temperature from −30° C. to 50° C., from −30° C. to 35° C., from −30° C. to 15° C., from 0° C. to 50° C., from 0° C. to 35° C., or from ° C. to 15° C., for example, In another example, the polymer binder particles can include hybrid particles of the polyurethane and the latex polymer, for example. For example, a polyurethane core and a latex shell can be prepared as a polyurethane-latex hybrid by copolymerizing the latex monomers, e.g., for a (meth) acrylic latex polymer or styrene (meth)acrylic latex polymer, in the presence of polyurethane particles. Surfactant can be used in some examples, but in other examples, surfactant can be omitted because the polyurethane can have properties that allow it to act as an emulsifier for the emulsion polymerization reaction. An initiator can be added to start the polymerization of the latex monomers, resulting in the polyurethane-latex hybrid particles.

The pigment in the ink composition can include pigment colorant, for example. In some examples, the pigment can be present in an amount from 0.5 wt % to 12 wt %, from 0.5 wt % to 10 wt %, from 1 wt % to 8 wt %, or from 2 wt % to 6 wt % in the ink composition. The pigment in the ink composition can be self-dispersed with a polymer, oligomer, or small molecule; or can be dispersed with a separate dispersant. Furthermore, the pigment can be any of a number of pigments of any of a number of primary or secondary colors, or can be black or white, for example. More specifically, colors can include cyan, magenta, yellow, red, blue, violet, red, orange, green, etc. In one example, the ink composition can be a black ink with a carbon black pigment. In another example, the ink composition can be a cyan or green ink with a copper phthalocyanine pigment, e.g., Pigment Blue 15:0, Pigment Blue 15:1; Pigment Blue 15:3, Pigment Blue 15:4, Pigment Green 7, Pigment Green 36, etc. In another example, the ink composition can be a magenta ink with a quinacridone pigment or a co-crystal of quinacridone pigments. Example quinacridone pigments that can be utilized can include PR122, PR192, PR202, PR206, PR207, PR209, P048, P049, PV19, PV42, or the like. These pigments tend to be magenta, red, orange, violet, or other similar colors. In one example, the quinacridone pigment can be PR122, PR202, PV19, or a combination thereof. In another example, the ink composition can be a yellow ink with an azo pigment, e.g., PY74 and PY155. Other examples of pigments include the following, which are available from BASF Corp.: Paliogen® Orange, Heliogen® Blue L 6901F, Heliogen® Blue NBD 7010, Heliogen® Blue K 7090, Heliogen® Blue L 7101F, Heliogen® Blue L 6470, Heliogen® Green K 8683, Heliogen® Green L 9140, Chromophtal® Yellow 3G, Chromophtal® Yellow GR, Chromophtal® Yellow 8G, Igrazin® Yellow SGT, and Igralite® Rubine 4BL. The following pigments are available from Degussa Corp.: Color Black FW1, Color Black FW2, Color Black FW2V, Color Black 18, Color Black, FW200, Color Black 5150, Color Black S160, and Color Black 5170. The following black pigments are available from Cabot Corp.: Regal 400R, Regal 330R, Regal 660R, Mogul® L, Black Pearls® L, Monarch® 1400, Monarch® 1300, Monarch® 1100, Monarch® 1000, Monarch® 900, Monarch® 880, Monarch® 800, and Monarch® 700. The following pigments are available from Orion Engineered Carbons GMBH: Printex® U, Printex® V, Printex® 140U, Printex® 140V, Printex® 35, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Ti-Pure® R-101. The following pigments are available from Heubach: Monastral® Magenta, Monastral® Scarlet, Monastral® Violet R, Monastral® Red B, and Monastral® Violet Maroon B. The following pigments are available from Clariant: Dalamar® Yellow YT-858-D, Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Sun Chemical: Quindo® Magenta, Indofast® Brilliant Scarlet, Quindo® Red R6700, Quindo® Red R6713, Indofast® Violet, L74-1357 Yellow, L75-1331 Yellow, L75-2577 Yellow, and LHD9303 Black. The following pigments are available from Birla Carbon: Raven® 7000, Raven® 5750, Raven® 5250, Raven® 5000 Ultra® II, Raven® 2000, Raven® 1500, Raven® 1250, Raven® 1200, Raven® 1190 Ultra®, Raven® 1170, Raven® 1255, Raven® 1080, and Raven® 1060. The following pigments are available from Mitsubishi Chemical Corp.: No. 25, No. 33, No. 40, No. 47, No. 52, No. 900, No. 2300, MCF-88, MA600, MA7, MA8, and MA100. The colorant may be a white pigment, such as titanium dioxide, or other inorganic pigments such as zinc oxide and iron oxide.

Specific other examples of a cyan color pigment may include C.I. Pigment Blue-1, -2, -3, -15, -15:1-15:2, -15:3, -15:4, -16, -22, and -60; magenta color pigment may include C.I. Pigment Red-5, -7, -12, -48, -48:1, -57, -112, -122, -123, -146, -168, -177, -184, -202, and C.I. Pigment Violet-19; yellow pigment may include C.I. Pigment Yellow-1, -2, -3, -12, -13, -14, -16, -17, -73, -74, -75, -83, -93, -95, -97, -98, -114, -128, -129, -138, -151, -154, and -180. Black pigment may include carbon black pigment or organic black pigment such as aniline black, e.g., C.I. Pigment Black 1. While several examples have been given herein, it is to be understood that any other pigment can be used that is useful in color modification, or dye may even be used in addition to the pigment.

Furthermore, pigments and dispersants are described separately herein, but there are pigments that are commercially available which include both the pigment and a dispersant suitable for ink composition formulation. Specific examples of pigment dispersions that can be used, which include both pigment solids and dispersant are provided by example, as follows: HPC-K048 carbon black dispersion from DIC Corporation (Japan), HSKBPG-11-CF carbon black dispersion from Dom Pedro (USA), HPC-0070 cyan pigment dispersion from DIC, Cabojet® 250C cyan pigment dispersion from Cabot Corporation (USA), 17-SE-126 cyan pigment dispersion from Dom Pedro, HPF-M046 magenta pigment dispersion from DIC, Cabojet® 265M magenta pigment dispersion from Cabot, HPJ-Y001 yellow pigment dispersion from DIC, 16-SE-96 yellow pigment dispersion from Dom Pedro, or Emacol SF Yellow AE2060F yellow pigment dispersion from Sanyo (Japan).

Thus, the pigment(s) can be dispersed by a dispersant that is adsorbed or ionically attracted to a surface of the pigment or can be covalently attached to a surface of the pigment as a self-dispersed pigment. In one example, the dispersant can be an acrylic dispersant, such as a styrene (meth)acrylate dispersant, or other dispersant suitable for keeping the pigment suspended in the liquid vehicle. In one example, the styrene (meth)acrylate dispersant can be used, as it can promote π-stacking between the aromatic ring of the dispersant and various types of pigments. In one example, the styrene (meth)acrylate dispersant can have a weight average molecular weight from 4,000 Mw to 30,000 Mw. In another example, the styrene-acrylic dispersant can have a weight average molecular weight of 8,000 Mw to 28,000 Mw, from 12,000 Mw to 25,000 Mw, from 15,000 Mw to 25,000 Mw, from 15,000 Mw to 20,000 Mw, or about 17,000 Mw. Regarding the acid number, the styrene (meth)acrylate dispersant can have an acid number from 100 to 350, from 120 to 350, from 150 to 300, from 180 to 250, for example. Example commercially available styrene-acrylic dispersants can include Joncryl® 671, Joncryl® 71, Joncryl® 96, Joncryl® 680, Joncryl® 683, Joncryl® 678, Joncryl® 690, Joncryl® 296, Joncryl® 671, Joncryl® 696 or Joncryl® ECO 675 (all available from BASF Corp., Germany).

It is noted that, as used in this specification and the appended claims, the singular forms "a," "an," and "the" include plural referents unless the content clearly dictates otherwise. As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

The term "acid value" or "acid number" refers to the mass of potassium hydroxide (KOH) in milligrams that can be used to neutralize one gram of substance (mg KOH/g), such as the polyurethane disclosed herein. This value can be determined, in one example, by dissolving or dispersing a known quantity of a material in organic solvent and then titrating with a solution of potassium hydroxide (KOH) of known concentration for measurement.

"Glass transition temperature" or "Tg," can be calculated by the Fox equation: copolymer Tg=1/(Wa/(Tg A)+Wb(Tg B)+ . . . ) where Wa=weight fraction of monomer A in the copolymer and TgA is the homopolymer Tg value of monomer A, Wb=weight fraction of monomer B and TgB is the homopolymer Tg value of monomer B, etc. With polyurethane, the hard segments and soft segments can be used to calculate the glass transition temperature of the polymer with the hard and soft segments being calculated based on the various segments used as the homopolymer for the calculation.

"D50" particle size is defined as the particle size at which about half of the particles are larger than the D50 particle size and about half of the other particles are smaller than the D50 particle size (by weight based on the metal particle content of the particulate build material). As used herein, particle size with respect to the polyurethane particles can be based on volume of the particle size normalized to a spherical shape for diameter measurement, for example. Particle size can be collected using a Malvern Zetasizer, for example. Likewise, the "D95" is defined as the particle size at which about 5 wt % of the particles are larger than the D95 particle size and about 95 wt % of the remaining particles are smaller than the D95 particle size. Particle size information can also be determined and/or verified using a scanning electron microscope (SEM).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is merely illustrative of the methods and systems herein. Numerous modifications and alternative methods and systems may be devised without departing from the present disclosure. Thus, while the technology has been described above with particularity, the following provides further detail in connection with what are presently deemed to be the acceptable examples.

Example 1—Synthesis of Salt-Compatible Polyurethane Particles—PUB A 65.797 grams of polyester diol (Stepanpol® PC-1015-55, from Stepan Company, USA), 22.977 grams of isophorone diisocyanate (IPDI), 3.440 grams of 1,4-butanediol, and 64 grams of acetone were mixed in a 500 mL of 4-neck round bottom flask. A mechanical stirrer with glass rod and Teflon blade was attached. A condenser was also attached. The flask was immersed in a constant temperature bath at 75° C. The system was kept under drying tube. Three (3) drops of dibutyltin dilaurate (DBTDL) was added to initiate the polymerization. Polymerization was continued for 3 hours at 75° C. 0.5 gram samples was withdrawn for wt % NCO titration to confirm the reaction. 4.082 grams of poly(ethylene oxide) methyl ether (Mn=2,000) in 10 grams of acetone was added to the reactor. The polymerization was continued 3 hours at 75° C. 0.5 g of pre-polymer was withdrawn for final wt % NCO titration. The measured NCO value was 2.78 wt %. The theoretical wt % NCO should be 2.79 wt %. The polymerization temperature was reduced to 50° C. 7.368 grams of sodium 2-[(2-aminoethyl)amino]ethanesulfonate (Vestamin® A-95, 50% in water, from Evonik, Germany) in 213.183 grams of DI water was added over 30 minutes. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent, from Byk Additives Ltd., United Kingdom). The final PUB dispersion was filtered through fiber glass filter paper. Particle size measured by Malvern Zetasizer is 178.7 nm; pH was 8.0; and solid content was 28.28 wt %.

Example 2—Synthesis of Salt-Compatible Polyurethane Particles—PUB B 71.363 g of g of polyester diol (Stepanpol PC-1015-55), 16.633 g of 1,3-bis(isocyanatomethyl)cyclohexane (Takenate 600, H6XDI), and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 4.309 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 4.92%. The theoretical % NCO should be 4.94%. The polymerization temperature was reduced to 50° C., a solution of 3.737 g of isophorone diamine (IPD) and 5.855 g of sodium 2-[(2-aminoethyl)amino]ethanesulphonate (Vestamin® A-95, 50% in water) in 50 grams of DI water was added over 10 min. After 15 min, 170.837 g of DI water was added over 10 min. The solution became milky and white color and the milky dispersion was continued to stir for overnight at room temperature. The PUB dispersion was filtered through 400 mesh stainless sieve. Acetone was removed with Rotorvap® at 50° C. (add 2 drops (20 mg) BYK-011 de-foaming agent). The final PUB dispersion was filtered through fiber glass filter paper. Particle size measured by Malvern Zetasizer is 352.1 nm. Its pH was 7.0. Solid content was 30.8%.

Example 3—Synthesis of Salt-Compatible Polyurethane Particles—PUB C 69.570 g of g of polyester diol (Stepanpol PC-1015-55), 19.706 g of isophorone diisocyanate (IPDI) and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 4.201 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 4.79%. The theoretical % NCO should be 4.81%. The polymerization temperature was reduced to 50° C., a solution of 3.669 g of 2,2,4 (or 2, 4, 4)-trimethylhexane-1, 6-diamine (TMD) and 5.855 g of sodium 2-[(2-aminoethyl)amino]ethanesulphonate (Vestamin A-95, 50% in water) in 50 grams of DI water was added over 10 min. After 15 min, 170.955 g of DI water was added over 10 min. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent). The final PUB dispersion was filtered through fiber glass filter paper. Particle size measured by Malvern Zetasizer is 205.6 nm. Its pH was 7. Solid content was 24.32%.

Example 4—Synthesis of Salt-Compatible Polyurethane Particles—PUB D 69.768 g of g of polyester diol (Stepanpol PC-1015-55), 19.763 g of isophorone disisocyanate (IPDI) and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 3.920 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 4.79%. The theoretical % NCO should be 4.81%. The polymerization temperature was reduced to 50° C., a solution of 3.394 g of 2,2,4 (or 2, 4, 4)-trimethylhexane-1,6-diamine (TMD) and 5.724 g of sodium 2-[(2-aminoethyl)amino]ethanesulphonate (Vestamin A-95, 50% in water) in 50 grams of DI water was added over 10 min. After 15 min, 170.659 g of DI water was added over 30 min. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent). The final PUB dispersion was filtered through fiber glass filter paper. Particle size measured by Malvern Zetasizer is 349.3 nm. Its pH was 7.0. Solid content was 23.79%.

Example 5—Synthesis of Salt-Compatible Polyurethane Particles—PUB E 69.278 g of g of polyester diol (Stepanpol PC-1015-55), 19.624 g of isophorone disisocyanate (IPDI) and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 4.183 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 4.79%. The theoretical % NCO should be 4.81%. The polymerization temperature was reduced to 50° C., a solution of 3.931 g of isophorone diamine (IPD) and 5.968 g of sodium 2-[(2-aminoethyl)amino]ethanesulphonate (Vestamin A-95, 50% in water) in 40 grams of DI water was added over 10 min. After 15 min, 180.679 g of DI water was added over 30 min. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent). The final PUB dispersion was filtered through fiber glass filter paper. Particle size measured by Malvern Zetasizer is 203.0 nm. Its pH was 6.50. Solid content was 19.91%.

Example 6—Synthesis of Salt-Compatible Polyurethane Particles—PUB F 70.620 g of g of polyester diol (Stepanpol PC-1015-55), 18.762 g of 2,2,4 (or 2, 4, 4)-trimethylhexane-1,6-diisocyanate (TMDI) and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 4.228 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 4.83%. The theoretical % NCO should be 4.86%. The polymerization temperature was reduced to 50° C., a solution of 3.973 g of isophorone diamine (IPD) and 6.032 g of sodium 2-[(2-aminoethyl)amino]ethanesulphonate (Vestamin A-95, 50% in water) in 40 grams of DI water was added over 10 min. After 15 min, 170.638 g of DI water was added over 30 min. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent). The final PUB dispersion was filtered through fiber glass filter paper. Particle size measured by Malvern Zetasizer is 176.6 nm. Its pH was 7.0. Solid content was 25.46%.

Example 7—Synthesis of Salt-Compatible Polyurethane Particles—PUB G 71.037 g of g of polyester diol (Stepanpol PC-1015-55), 17.583 g of 1,3-bis(isocyanatomethyl)cyclohexane (Takenate 600, H6XDI) and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 4.290 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 4.92%. The theoretical % NCO should be 4.94%. The polymerization temperature was reduced to 50° C., a solution of 4.031 g of isophorone diamine (IPD) and 6.119 g of sodium 2-[(2-aminoethyl)amino]ethanesulphonate (Vestamin A-95, 50% in water) in 50 grams of DI water was added over 10 min. After 15 min, 170.582 g of DI water was added over 30 min. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent). The final PUB dispersion was filtered through fiber glass filter paper. Particle size measured by Malvern Zetasizer is 349.3 nm. Its pH was 7.00. Solid content was 23.79%.

Example 8—Synthesis of Salt-Compatible Polyurethane Particles—PUB H 69.470 g of g of polyester diol (Stepanpol PC-1015-55), 19.679 g of isophorone diisocyanate (IPDI) and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 4.195 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 4.79%. The theoretical % NCO should be 4.81%. The polymerization temperature was reduced to 50° C., a solution of 3.664 g of 2,2,4 (or 2, 4, 4)-trimethylhexane-1, 6-diamine (TMD) and 5.984 g of sodium 2-[(2-aminoethyl) amino]ethanesulphonate (Vestamin A-95, 50% in water) in 50 grams of DI water was added over 10 min. After 15 min, 170.390 g of DI water was added over 10 min. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent). The final PUB dispersion was filtered through fiber glass filter paper. Particle size measured by Malvern Zetasizer is 248.8 nm. Its pH was 8.00. Solid content was 15.41%.

Example 9—Synthesis of Salt-Compatible Polyurethane Particles—PUB I 63.177 g of g of polyester diol (Stepanpol PC-1015-55), 26.062 g of 4,4'-methylene dicyclohexyl diisocyanate (H12MDI), 3.303 g of 1,4-butanediol and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of DBTDL was added to initiate the polymerization. Polymerization was continued for 3 hrs at 75° C. 0.5 g samples was withdrawn for % NCO titration to confirm the reaction. 3.920 g of poly(ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 2.65%. The theoretical % NCO should be 2.68%. The polymerization temperature was reduced to 50° C. 7.075 g of sodium 2-[(2-aminoethyl)amino]ethanesulphonate (Vestamin A-95, 50% in water) in 216.956 g of DI water was added over 30 min. The solution became milky and white color and the milky dispersion was continued to stir for overnight at room temperature. The PUB dispersion was filtered through 400 mesh stainless sieve. Acetone was removed with rotorvap at 50° C. (add 2 drops (20 mg) BYK-011 de-foaming agent). The final PUB dispersion was filtered through fiber glass filter paper. Particle size measured by Malvern Zetasizer is 291.1 nm. Its pH was 8.81. Solid content was 29.08%.

Example 10—Preparation of Pre-Treatment Composition and Printable Medium Samples Different pre-treatment formulations are prepared. The formulation T1 to T5 are illustrated in Table 2 below. Each amount ingredient is expressed in weight %. Each of the pre-treatment compositions T 1, T2, T3, T4 and T5, includes 1 part of surfactant such as BYK®Dynwet 800 (available from BYK), and DI water to adjust the pre-treatment composition to a 3% solid content. Pre-treatment formulation T5 is a comparative formulation that does not includes the reactive cross-linker Polycup®7360A (polyimine-based azetidinium salt, available from Solenis Ltd.)

TABLE 2

| | Pre-treatment formulation | | | | |
|---|---|---|---|---|---|
| Ingredient | T1 | T2 | T3 | T4 | T5 |
| BYK ®Dynwet 800 | 1.2 | 1.2 | 1.2 | 1.2 | 1.2 |
| Polycup ® 7360A | 37.1 | 37.1 | 37.1 | 37.1 | 0.0 |
| PUB-E | 61.7 | — | — | — | — |
| PUB-F | — | 61.7 | — | — | — |
| PUB-H | — | — | 61.7 | — | — |
| PUB-I | — | — | — | 61.7 | 98.8 |
| DI Water | Up to 100% | Up to 100% | Up to 100% | Up to 100% | Up to 100% |

Different pre-treated media are made using the different pre-treatment formulation. The media samples Ex. 1 to Ex. 5 are obtained by applying 3 gsm of the pre-treatment formulation T1 to T5 to a fabric-based substrate which is a 100% woven polyester fabric (with plain weave) having a weight of 130 gsm and thickness of 175 micrometers (μm). The applications of the pre-treatment compositions are done using a textile padding machine equipped with two rubber rollers. Sample Ex. 6 is an un-treated fabric media (i.e. it has not been treated with the pre-treatment composition).

Example 11—Samples Performances

The same images are printed on the experimental media samples Ex. 1 to Ex. 6 with a thermal inkjet pen (at 3 dpp ink with an A3410, available from HP Inc., California). The printed samples were cured by heating at 150° C. for 3 minutes.

After printing and heat curing, the printed images were measured initially for optical density (OD). Optical density is measured herein using an X-RITE™ Spectrodensitometer (X-Rite Corporation), such as a Series 500 Densitometer.

To test washfastness, the cured samples were then washed for 5 cycles using a washing machine at 40° C. with detergent and then air dried. The OD after 5 washes was again measured using the same instrument. The % change in optical density (ΔOD) and various ΔE values (ΔE 2000) were collected to compare the samples before washing and the samples after washing. Tables 3 and 4 illustrates the resulting printing performances and durability for images printed on experimental media samples Ex. 1 to Ex. 5.

The various pre-treated samples were evaluated to obtain initial optical density (OD) and L*a*b* color space values, which are represented in the following tables as "pre-wash" values. Then, the printed fabric substrates were washed in a standard washing machine typically used to wash clothing, namely the WHIRLPOOL® WTW5000DW, with detergent. The washing machine settings were set as follows: Soil level "medium," temperature "warm," e.g., about 40° C., and wash setting "normal" with a single rinse cycle. The full washing machine cycle was repeated for 5 full washes, air drying the printed fabric substrates between wash cycles. After the five fully washing cycles, optical density (OD) and L*a*b* values were again measured for comparison. The delta E (ΔE) values were calculated using the 2000 standard denoted as $\Delta E_{2000}$.

Table 4 shows the OD obtained after printing black and yellow inks on the media samples Ex 1 to Ex 5 before and after wash. Table 5 shows the wash durability (washfastness) of those prints with black and yellow inks on experimental media samples Ex 1 to Ex 5.

In accordance with this, as can be seen in Tables 3 and 4, the poorest performing printed samples with respect to OD and washfastness were generated when using the media that does not include the pre-treatment composition containing the combination of reactive crosslinking agent and salt-compatible polyurethane particles according to the present disclosure.

TABLE 3

| OD | Ex-1 Before wash | Ex-1 After wash | Ex-2 Before wash | Ex-2 After wash | Ex-3 Before wash | Ex-3 After wash | Ex-4 (comp.) Before wash | Ex-4 (comp.) After wash | Ex-5 (comp.) Before wash | Ex-5 (comp.) After wash |
|---|---|---|---|---|---|---|---|---|---|---|
| Black Ink | 1.133 | 1.104 | 1.131 | 1.106 | 1.153 | 1.095 | 1.126 | 0.781 | 1.164 | 0.801 |
| Yellow Ink | 1.131 | 1.036 | 1.16 | 1.081 | 1.142 | 1.006 | 1.107 | 0.728 | 1.137 | 0.81 |

TABLE 4

| ΔE | Ex-1 | Ex-2 | Ex-3 | Ex-4 (comp.) | Ex-5 (comp.) |
|---|---|---|---|---|---|
| Black $\Delta E_{(2000)}$ | 2 | 2.4 | 2 | 13.9 | 14.3 |
| Yellow $\Delta E_{(2000)}$ | 1.2 | 1.6 | 1.2 | 5 | 4.3 |

Inks that were used for this printing examples on pre-treated media were formulated based on the following recipe: 6% of an anionic aliphatic polyester-polyurethane dispersion (Impranil® DLN-SD, commercially available from Covestro AG), 6% of glycerol, 0.5% of Crodafos®N-3 Acid commercially available from Witco Corp. (Middlebury, Conn.), 1% of liponic ethylene glycol (LEG-1)), 0.22% of Acticide® B20 commercially available from THOR Group Ltd, 0.3% of Surfynol commercially available from Air Products 440, 3% of cyan pigment dispersion or 2.5% carbon black (for Black ink) or 3% of yellow pigment (for the yellow ink) and balance of water.

The term "washfastness" can be defined as the optical density (OD) or delta E (ΔE) that is retained after five (5) standard washing machine cycles using warm water and a standard clothing detergent (e.g., TIDE® available from Procter and Gamble, Cincinnati, Ohio, USA). By measuring OD and/or L*a*b* both before and after washing, ΔOD and ΔE value can be determined, which is a quantitative way of expressing the difference between the OD and/or L*a*b* prior to and after undergoing the washing cycles. Thus, the lower the ΔOD and ΔE values, the better. In further detail, ΔE is a single number that represents the "distance" between two colors, which in accordance with the present disclosure, is the color (or black) prior to washing and the modified color (or modified black) after washing.

Colors, for example, can be expressed as CIELAB values. It is noted that color differences may not be symmetrical going in both directions (pre-washing to post washing vs. post-washing to pre-washing). Using the CIE 1976 definition, the color difference can be measured and the ΔE value calculated based on subtracting the pre-washing color values of L*, a*, and b* from the post-washing color values of L*, a*, and b*. Those values can then be squared, and then a square root of the sum can be determined to arrive at the ΔE value. The 1976 standard can be referred to herein as "ΔE CIE." The CIE definition was modified in 1994 to address some perceptual non-uniformities, retaining the L*a*b* color space, but modifying to define the L*a*b* color space with differences in lightness (L*), chroma (C*), and hue (h*) calculated from L*a*b* coordinates. This can be referred to herein as the "ΔE 1994." Then in 2000, the CIEDE standard was established to further resolve the perceptual non-uniformities by adding five corrections, namely i) hue rotation ($R_T$) to deal with the blue region at hue angles of about 275°), ii) compensation for neutral colors or the primed values in the L*C*h differences, iii) compensation for lightness ($S_L$), iv) compensation for chroma ($S_c$), and v) compensation for hue (SH). The 2000 modification can be referred to herein as "ΔE 2000." In accordance with examples of the present disclosure, ΔE value can be determined using the CIE definition established in 1976, 1994, and 2000 to demonstrate washfastness. Further, a difference measurement has also been established, based on an L*C*h model was defined and called CMC 1:c. This metric has two parameters: lightness (1) and chroma (c), allowing users to weigh the difference based on the ratio of 1:c that is deemed appropriate for the application. Commonly used values include 2:1 for acceptability and 1:1 for threshold of imperceptibility. This difference metric is also reported in various examples of the present disclosure. This can be referred to as "ΔE CMC 2:1" or "ΔE CMC 1:1," depending on the 1 and c values selected for measurement.

The invention claimed is:

1. A pre-treatment composition comprising water, a reactive crosslinking agent and salt-compatible polyurethane particles including sulfonated- or carboxylated-diamine groups, isocyanate-generated amine groups, and polyalkylene oxide side-chains.

2. The pre-treatment composition according to claim 1 wherein the reactive crosslinking agent is present in the pre-treatment composition in an amount representing from about 5 wt % to about 75 wt % of the total weight of the pre-treatment composition.

3. The pre-treatment composition according to claim 1 wherein the reactive crosslinking agent is a heterocyclic ammonium salt.

4. The pre-treatment composition according to claim 1 wherein the reactive crosslinking agent is an azetidinium-containing polyamine polymer.

5. The pre-treatment composition according to claim 1 wherein the reactive crosslinking agent includes the structure:

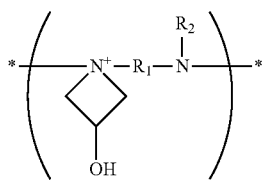

where $R_1$ is a substituted or unsubstituted $C_2$-$C_{12}$ linear alkyl group and $R_2$ is H or $CH_3$.

6. The pre-treatment composition according to claim 1 wherein the salt-compatible polyurethane particles have a D50 particle size from 20 nm to 300 nm.

7. The pre-treatment composition according to claim 1 wherein the salt-compatible polyurethane particles have an acid number from 0 mg KOH/g to 30 mg KOH/g.

8. The pre-treatment composition according to claim 1 wherein the polyalkylene oxide side-chains include polyethylene oxide side-chains, polypropylene oxide side-chains, or a combination thereof, and wherein the polyalkylene oxide side-chains have a number average molecular weight from 500 Mn to 15,000 Mn.

9. The pre-treatment composition according to claim 1 wherein the salt-compatible polyurethane particles further comprising polymerized nonionic aliphatic diols.

10. The pre-treatment composition according to claim 1 wherein the salt-compatible polyurethane particles have an acid number from 0 mg KOH/g to 30 mg KOH/g, have a D50 particle size from 20 nm to 300 nm, and have polyalkylene oxide side-chains.

11. The pre-treatment composition according to claim 1 wherein the weight ratio of the salt-compatible polyurethane particles to the reactive crosslinking agent is from about 40:60 to about 10:90.

12. The pre-treatment composition according to claim 1 further comprising a fixing agent including metal inorganic salt, metal organic salt, cationic polymer, or a combination thereof.

13. A pre-treated printable medium comprising:
 a. a base substrate;
 b. and a pre-treatment composition applied over, at least, one side of the base substrate, forming an image-receiving surface, and comprising water, reactive crosslinking agents and salt-compatible polyurethane particles including sulfonated- or carboxylated-diamine groups, isocyanate-generated amine groups, and polyalkylene oxide side-chains.

14. The pre-treated printable medium of claim 13 wherein the base substrate is a fabric base substrate.

15. A method of making a pre-treated printable medium comprising:
 a. applying a pre-treatment composition as a layer to a media substrate, the coating composition including water, reactive crosslinking agents and salt-compatible polyurethane particles including sulfonated- or carboxylated-diamine groups, isocyanate-generated amine groups, and polyalkylene oxide side-chains;
 b. drying the pre-treatment composition to remove water from the media substrate to leave an image-receiving surface thereon.

* * * * *